United States Patent
Arensmeier et al.

(10) Patent No.: US 10,373,126 B2
(45) Date of Patent: *Aug. 6, 2019

(54) HVAC SYSTEM REMOTE MONITORING AND DIAGNOSIS

(71) Applicant: EMERSON ELECTRIC CO., St. Louis, MO (US)

(72) Inventors: Jeffrey N. Arensmeier, Fenton, MO (US); Steven A. Cox, Jr., Clayton, MO (US); Paul Layton, Brentwood, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,896

(22) Filed: Aug. 21, 2017

(65) Prior Publication Data

US 2018/0130031 A1    May 10, 2018

Related U.S. Application Data

(63) Continuation of application No. 13/780,617, filed on Feb. 28, 2013, now Pat. No. 9,741,023.

(Continued)

(51) Int. Cl.
*G06Q 10/10* (2012.01)
*G06Q 10/00* (2012.01)
(Continued)

(52) U.S. Cl.
CPC ............. *G06Q 10/20* (2013.01); *F24F 11/30* (2018.01); *F24F 11/47* (2018.01); *F24F 11/52* (2018.01)

(58) Field of Classification Search
CPC .................................................... G06Q 10/20
See application file for complete search history.

(56) References Cited

U.S. PATENT DOCUMENTS 4,924,418 A    5/1990    Bachman et al.
5,347,476 A    9/1994    McBean, Sr.
(Continued)

FOREIGN PATENT DOCUMENTS

CN    1374787 A    10/2002
CN    1647005 A    7/2005
(Continued)

OTHER PUBLICATIONS

International Search Report regarding Application No. PCT/US2013/028312, dated Jun. 12, 2013.

(Continued)

*Primary Examiner* — Dennis W Ruhl
(74) *Attorney, Agent, or Firm* — Harness, Dickey & Pierce, P.L.C.

(57) ABSTRACT

A method of operating a heating, ventilation, or air conditioning (HVAC) monitoring system includes, at a remote monitoring apparatus, receiving and storing frames of data from a local monitoring device installed at a building. Each of the frames includes time domain current data based on a measured aggregate current supplied to a plurality of components of an HVAC system of the building and frequency domain data based on the measured aggregate current. The method includes, based on the frequency domain current data and exclusive of individual current data from a plurality of individual current sensors, determining an individual contribution of a first component of the HVAC system to the measured aggregate current. The method includes transmitting information based on the stored current data to an HVAC manufacturer. The method includes, if a problem is identified with the first component using the determined individual contribution, transmitting an alert message.

20 Claims, 17 Drawing Sheets

Related U.S. Application Data

(60) Provisional application No. 61/604,293, filed on Feb. 28, 2012.

(51) Int. Cl.
*F24F 11/30* (2018.01)
*F24F 11/52* (2018.01)
*F24F 11/47* (2018.01)

(56) References Cited

U.S. PATENT DOCUMENTS

| | | | |
|---|---|---|---|
| 5,839,094 | A | 11/1998 | French |
| 6,013,108 | A | 1/2000 | Karolys et al. |
| 6,510,350 | B1 | 1/2003 | Steen, III et al. |
| 6,643,611 | B1 | 11/2003 | Ito et al. |
| 6,823,288 | B2 | 11/2004 | Ito et al. |
| 6,925,420 | B2 | 8/2005 | Ito et al. |
| 7,308,322 | B1 | 12/2007 | Discenzo et al. |
| 7,383,158 | B2 | 6/2008 | Krocker et al. |
| 7,999,668 | B2 | 8/2011 | Cawthorne et al. |
| 8,156,208 | B2 | 4/2012 | Bornhoevd et al. |
| 9,741,023 | B2 * | 8/2017 | Arensmeier ........... G06Q 10/20 |
| 2002/0035495 | A1 | 3/2002 | Spira et al. |
| 2002/0128728 | A1 | 9/2002 | Murakami et al. |
| 2002/0173929 | A1 | 11/2002 | Seigel |
| 2003/0195640 | A1 | 10/2003 | Krocker et al. |
| 2004/0044502 | A1 | 3/2004 | Ito et al. |
| 2005/0043924 | A1 | 2/2005 | Ito et al. |
| 2005/0125102 | A1 | 6/2005 | Nichols et al. |
| 2005/0247194 | A1 | 11/2005 | Kang et al. |
| 2007/0012052 | A1 | 1/2007 | Butler et al. |
| 2007/0089440 | A1 | 4/2007 | Singh et al. |
| 2010/0312605 | A1 | 12/2010 | Mitchell et al. |
| 2010/0326470 | A1 | 12/2010 | Seippel |
| 2011/0015798 | A1 | 1/2011 | Golden et al. |
| 2011/0087609 | A1 | 4/2011 | Stein |
| 2011/0087988 | A1 | 4/2011 | Ray et al. |
| 2011/0301985 | A1 | 12/2011 | Camp et al. |
| 2011/0307282 | A1 | 12/2011 | Camp et al. |
| 2011/0313804 | A1 | 12/2011 | Camp et al. |
| 2012/0265491 | A1 | 10/2012 | Drummy |
| 2012/0323642 | A1 | 12/2012 | Camp et al. |

FOREIGN PATENT DOCUMENTS

| | | |
|---|---|---|
| CN | 101329564 A | 12/2008 |
| CN | 101726075 A | 6/2010 |
| CN | 102158527 A | 8/2011 |
| CN | 102261721 A | 11/2011 |
| CN | 102289725 A | 12/2011 |
| CN | 102331069 A | 1/2012 |
| CN | 102354206 A | 2/2012 |
| JP | 63302238 A | 12/1988 |
| JP | 2001324200 A | 11/2001 |
| JP | 2004286279 A | 10/2004 |
| KR | 10-0149919 | 3/1999 |
| WO | WO-2005057300 A2 | 6/2005 |
| WO | WO-11069170 A1 | 6/2011 |

OTHER PUBLICATIONS

Written Opinion of the International Searching Authority regarding Application No. PCT/US2013/028312, dated Jun. 12, 2013.
First Office Action regarding Australian Patent Application No. 2013225926, dated Jun. 11, 2015.
Office Action regarding U.S. Appl. No. 13/780,617, dated Aug. 18, 2015.
Todd M. Rossi. "Unitary Air Conditioner Field Performance." Purdue University. Purdue e-Pubs. International Refrigeration and Air Conditioning Conference. School of Mechanical Engineering. 2004.
A7075A1000 HVAC Service Assistant. Honeywell. 2001.
Kimberly Schwartz. "Extended Warranties Can Help Contractors Expand Their Sales." May 16, 2011.
COPs, EERs, and SEERs. How Efficient is Your Air Conditioning System? Power knot. Mar. 25, 2011.
Akarsha Ramani. "Diagnosis and Prognosis of Electrical and Mechanical Faults Using Wireless Sensor Networks and Two-Stage Neural Network Classifier." The University of Texas at Arlington. Aug. 2008.
Leo A. Meyer. "How a DDC System Operates." Dec. 8, 2008.
"Right-$ Equipment Comparison and Cost Analysis at Your Fingertips." Wrightsoft. 2009-2015.
Office Action regarding Canadian Patent Application No. 2,865,697, dated Sep. 29, 2015.
Interview Summary regarding U.S. Appl. No. 13/780,617, dated Nov. 25, 2015.
Office Action regarding U.S. Appl. No. 13/780,617, dated May 20, 2016.
Office Action regarding Chinese Patent Application No. 201380022508.5, dated May 16, 2016. Translation provided by Unitalen Attorneys at Law.
Office Action regarding Canadian Patent Application No. 2865697, dated Oct. 4, 2016.
Office Action regarding U.S. Appl. No. 13/780,617, dated Oct. 17, 2016.
Applicant-Initiated Interview Summary regarding U.S. Appl. No. 13/780,617, dated Jan. 6, 2017.

* cited by examiner

Indoor

| FAULT / feature | Detect | | | | | | | | Predict | | | | | | | |
|---|---|---|---|---|---|---|---|---|---|---|---|---|---|---|---|---|
| | Primary | | | | | | Comp | | Primary | | | | | | Comp | |
| | Timing | Current | Temps | Pressure | Direct | FFT | Temp | Volts | Timing | Current | Temps | Pressure | Direct | FFT | Temp | Volts |
| Charge low | * | * | * | | | | | | * | * | * | | | | | * |
| Charge high | * | * | * | | | | | | * | * | * | | | | | * |
| Expansion device (HP) | * | * | * | * | | | * | | * | * | * | * | | | | * |
| Blocked outdoor coil | * | | * | | | | | | * | | * | | | | | |
| Blocked indoor coil | * | * | * | * | | | * | | * | * | * | * | | | | * |
| Frozen evaporator HP | * | * | * | | | | * | | * | * | * | | | | | * |
| Multifuel aware | | | | | * | | | | | | | | | | | |
| Blocked evaporator | * | * | * | * | | | * | | * | * | * | * | | | | * |
| Frozen evaporator | * | * | * | * | | | * | | * | * | * | * | | | | * |
| Expansion device | * | | * | | | | | | * | * | | * | | | | * |
| Open circulator windings | * | * | | | | | | | | | | | | | | |
| Circulator bearing | | * | | | * | * | | | | * | | | | * | * | |
| Circulator blades - belt | | * | | | * | * | | | | * | | | | * | * | |
| Circulator start cap | * | * | | | * | | * | | * | * | | | | * | * | |
| Wrong circulator speed | | * | | | | | | | | | | | | | | |
| Filter | | * | | * | * | | * | | | * | | | * | | | * |
| Ignitor | * | * | | | * | | * | | * | * | | | | * | | * |
| Gas valve | * | * | | | * | | | | | | | | | | | |
| Flame detect | * | * | | | * | | | | * | * | | | | * | | |
| Inducer | * | * | * | | | | | | * | * | * | | | * | | |
| Inducer loose blade | * | * | | | * | | * | | | | | | | | | |
| Combustion air blockage | * | * | | | | | | | * | * | | | | | | * |
| Hi limit | * | * | * | * | | | * | | * | * | * | * | | | | * |
| Roll out switch(es) | | | | | | | | | | | | | | | | |
| Inducer pressure switch | | | | | | | | | | | | | | | | |
| Ignition board fault | | | | | | | | | | | | | | | | |
| Low – High voltage | | | | | * | | * | | | | | | | | | |
| Heating performance | | | | | | | | | | | | | | | | |
| Cooling performance | * | * | * | * | | | * | | | | | | | | | |
| HP performance | * | * | * | * | | | * | | | | | | | | | |
| Energy monitor | | * | | | | | * | | | | | | | | | |
| Outside air temperature | | | | | | | | | | | | | | | | |
| Condensate pump | | | | | * | | | | | | | * | | | | |
| Duct leakage | | | | | | | | | | | | | | | | |
| Maintenance Reminders | * | | | | | | | | | | | | | | | |
| Short cycling | * | | | | | | | | | | | | | | | |
| No Power | | | | | * | | * | | | | | | | | | |

FIG. 12A

Outdoor

| FAULT / feature | Detect Primary | | | | | Detect Comp | | Predict Primary | | | | | Predict Comp | |
|---|---|---|---|---|---|---|---|---|---|---|---|---|---|---|
| | Timing | Current | Temps | Direct | FFT | OAT | Volts | Timing | Current | Temps | Direct | FFT | OAT | Volts |
| Charge low | * | * | * |  | * | * | * | * | * | * |  | * | * | * |
| Charge high | * | * | * |  | * | * | * | * | * | * |  | * | * | * |
| Expansion device (HP) | * | * | * |  |  | * | * | * | * | * |  |  | * | * |
| Blocked outdoor coil | * | * | * |  |  | * | * | * | * | * |  |  | * | * |
| Blocked indoor coil | * | * | * |  |  | * | * | * | * | * |  |  | * | * |
| Frozen evaporator HP | * | * | * |  |  | * | * | * | * | * |  |  | * | * |
| Compressor bearings |  |  |  |  |  |  |  |  |  |  |  |  |  |  |
| Compressor open winding |  |  |  |  |  |  |  |  |  |  |  |  |  |  |
| Start cap | * | * |  |  | ** | * | * | * | * |  |  | ** | * | * |
| Run cap |  | * |  |  | ** | * | * |  | * |  |  | ** | * | * |
| Start relay | * |  |  |  |  | * | * | * |  |  |  |  | * | * |
| Fan motor bearings | * | * |  |  | ** |  |  | * | * |  |  | ** |  |  |
| Fan motor open windings |  | * |  |  |  |  |  |  |  |  |  |  |  |  |
| Condenser fan cap |  | * |  |  | ** | * | * |  | * |  |  | ** | * | * |
| Condenser fan blade |  |  |  |  |  |  |  |  |  |  |  |  |  |  |
| Contactor(s) |  | * |  |  |  |  |  | * | * |  |  |  |  |  |
| Reverse valve state |  |  | * |  |  | * |  |  |  | * |  |  | * |  |
| Defrost | * |  | * |  |  | * |  | * |  | * |  |  | * |  |
| Multifuel aware |  |  |  |  |  |  |  |  |  |  |  |  |  |  |
| Blocked evaporator | * | * | * |  | * |  | * | * | * | * |  | * |  | * |
| Frozen evaporator | * | * | * |  | * |  | * | * | * | * |  | * |  | * |
| Expansion device | * | * | * |  | * |  | * | * | * | * |  | * |  | * |
| Low – High voltage |  |  |  | * |  |  | * |  |  |  |  |  |  |  |
| Heating performance |  |  |  |  |  |  |  |  |  |  |  |  |  |  |
| Cooling performance | * | * | * | * |  | * | * |  |  |  |  |  |  |  |
| HP performance | * | * | * | * |  | * | * |  |  |  |  |  |  |  |
| Energy monitor |  | * |  | * |  |  | * |  |  |  |  |  |  |  |
| Outside air temperature |  |  |  | * |  | * |  |  |  |  |  |  |  |  |
| Condensate pump |  |  |  |  |  |  |  |  |  |  |  |  |  |  |
| Duct leakage |  |  |  |  |  |  |  |  |  |  |  |  |  |  |
| Maintenance Reminders | * |  | * |  |  |  |  |  |  |  |  |  |  |  |
| Short cycling | * |  |  |  |  |  |  |  |  |  |  |  |  |  |
| No power |  |  |  | * |  |  | * |  |  |  |  |  |  |  |
| Humidifier Faults |  |  |  |  |  |  |  |  |  |  |  |  |  |  |

FIG. 12B

HVAC SYSTEM REMOTE MONITORING AND DIAGNOSIS

CROSS-REFERENCE TO RELATED APPLICATIONS

This application is a continuation of U.S. patent application Ser. No. 13/780,617 filed Feb. 28, 2013 (now U.S. Pat. No. 9,741,023), which claims priority to U.S. Provisional Application No. 61/604,293 filed Feb. 28, 2012. The entire disclosures of the above applications are incorporated by reference.

FIELD

The present disclosure relates to environmental comfort systems and more particularly to remote monitoring and diagnosis of residential and light commercial environmental comfort systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, or air conditioning) system controls environmental parameters, such as temperature and humidity, of a residence. The HVAC system may include, but is not limited to, components that provide heating, cooling, humidification, and dehumidification. The target values for the environmental parameters, such as a temperature set point, may be specified by a homeowner.

In FIG. 1, a block diagram of an example HVAC system is presented. In this particular example, a forced air system with a gas furnace is shown. Return air is pulled from the residence through a filter 110 by a circulator blower 114. The circulator blower 114, also referred to as a fan, is controlled by a control module 118. The control module 118 receives signals from a thermostat 122. For example only, the thermostat 122 may include one or more temperature set points specified by the homeowner.

The thermostat 122 may direct that the circulator blower 114 be turned on at all times or only when a heat request or cool request is present. The circulator blower 114 may also be turned on at a scheduled time or on demand. In various implementations, the circulator blower 114 can operate at multiple speeds or at any speed within a predetermined range. One or more switching relays (not shown) may be used to control the circulator blower 114 and/or to select a speed of the circulator blower 114.

The thermostat 122 also provides the heat and/or cool requests to the control module 118. When a heat request is made, the control module 118 causes a burner 126 to ignite. Heat from combustion is introduced to the return air provided by the circulator blower 114 in a heat exchanger 130. The heated air is supplied to the residence and is referred to as supply air.

The burner 126 may include a pilot light, which is a small constant flame for igniting the primary flame in the burner 126. Alternatively, an intermittent pilot may be used in which a small flame is first lit prior to igniting the primary flame in the burner 126. A sparker may be used for an intermittent pilot implementation or for direct burner ignition. Another ignition option includes a hot surface igniter, which heats a surface to a high enough temperature that when gas is introduced, the heated surface causes combustion to begin. Fuel for combustion, such as natural gas, may be provided by a gas valve 128.

The products of combustion are exhausted outside of the residence, and an inducer blower 134 may be turned on prior to ignition of the burner 126. The inducer blower 134 provides a draft to remove the products of combustion from the burner 126. The inducer blower 134 may remain running while the burner 126 is operating. In addition, the inducer blower 134 may continue running for a set period of time after the burner 126 turns off. In a high efficiency furnace, the products of combustion may not be hot enough to have sufficient buoyancy to exhaust via conduction. Therefore, the inducer blower 134 creates a draft to exhaust the products of combustion.

A single enclosure, which will be referred to as an air handler unit 208, may include the filter 110, the circulator blower 114, the control module 118, the burner 126, the heat exchanger 130, the inducer blower 134, an expansion valve 188, an evaporator 192, and a condensate pan 196.

In the HVAC system of FIG. 1, a split air conditioning system is also shown. Refrigerant is circulated through a compressor 180, a condenser 184, the expansion valve 188, and the evaporator 192. The evaporator 192 is placed in series with the supply air so that when cooling is desired, the evaporator removes heat from the supply air, thereby cooling the supply air. During cooling, the evaporator 192 is cold, which causes water vapor to condense. This water vapor is collected in the condensate pan 196, which drains or is pumped out.

A control module 200 receives a cool request from the control module 118 and controls the compressor 180 accordingly. The control module 200 also controls a condenser fan 204, which increases heat exchange between the condenser 184 and outside air. In such a split system, the compressor 180, the condenser 184, the control module 200, and the condenser fan 204 are located outside of the residence, often in a single condensing unit 212.

In various implementations, the control module 200 may simply include a run capacitor, a start capacitor, and a contactor or relay. In fact, in certain implementations, the start capacitor may be omitted, such as when a scroll compressor instead of a reciprocating compressor is being used. The compressor 180 may be a variable capacity compressor and may respond to a multiple-level cool request. For example, the cool request may indicate a mid-capacity call for cool or a high-capacity call for cool.

The electrical lines provided to the condensing unit 212 may include a 240 volt mains power line and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 180. In addition, the contactor may connect the 240 volt power supply to the condenser fan 204. In various implementations, such as when the condensing unit 212 is located in the ground as part of a geothermal system, the condenser fan 204 may be omitted. When the 240 volt mains power supply arrives in two legs, as is common in the U.S., the contactor may have two sets of contacts, and is referred to as a double-pole single-throw switch.

Monitoring of operation of components in the condensing unit 212 and the air handler unit 208 has traditionally been performed by multiple discrete sensors, measuring current individually to each component. For example, a sensor may sense the current drawn by a motor, another sensor measures resistance or current flow of an igniter, and yet another sensor monitors a state of a gas valve. However, the cost of these sensors and the time required for installation has made monitoring cost prohibitive.

SUMMARY

A method of operating a heating, ventilation, or air conditioning (HVAC) monitoring service is disclosed. The method includes: providing a local device for installation in an HVAC system of a residential or commercial building; periodically receiving data from the local device across a wide area network, wherein the received data includes electrical sensor data including at least one of current or power; and storing the received data. The method further includes: analyzing the stored data to selectively identify problems and selectively predict faults of the HVAC system; receiving a subscription fee corresponding to the building, the subscription fee applying to a calendar period; and during the calendar period, providing information on the identified problems and the predicted faults to a customer corresponding to the building.

In further features, the method further includes selling the local device. A price of the local device includes the subscription fee, and the calendar period begins when the local device is activated. In still further features, the price of the local device includes a lifetime subscription and the calendar period has no end date. In yet further features, the building is a residence and the customer is a homeowner of the residence.

In further features, the local device is installed by a first HVAC contractor. In still further features, the subscription fee is received from the first HVAC contractor. In yet further features, the customer pays the first HVAC contractor a service fee for a maintenance plan, and the subscription fee is paid by the first HVAC contractor from the service fee. In further features, the information on the identified problems and the predicted faults is also provided to the first HVAC contractor. In still further features, additional information on the identified problems and additional faults is provided to the first HVAC contractor.

In yet further features, the method further includes providing part information to the first HVAC contractor. The part information includes a list of one or more parts expected to be used in remedying the identified problems and predicted faults. In still further features, the method further includes providing skill information to the first HVAC contractor for use in selecting a technician. The skill information includes a list of skills expected to be needed in remedying the identified problems and predicted faults.

In further features, the method further includes providing a second local device for installation at the building. In yet further features, the local device is located proximate to an air handler unit of the HVAC system and the second local device is located proximate to a condensing unit of the HVAC system. In still further features, the received data includes electrical sensor data of the air handler unit measured by the local device and includes electrical sensor data of the condensing unit measured by the second local device.

In yet further features, the providing information includes sending an alert message to the customer. In still further features, the alert message includes at least one of a voice-mail message, a text message, or an email message. In further features, the alert message includes contact information for an HVAC contractor. In yet further features, the providing information includes calling the customer.

In still further features, the selectively identifying problems includes selectively identifying a reduced efficiency of the HVAC system in response to the stored data. In further features, the method further includes waiting to send information regarding the reduced efficiency to the customer until the reduced efficiency falls below a threshold. In yet further features, the method further includes determining the threshold based on a make and model number of the HVAC system. In still further features, the method further includes determining the threshold based on an initial efficiency determination performed on the HVAC system.

In further features, the wide area network includes the Internet. In yet further features, the method further includes aperiodically receiving data over the wide area network in response to events in the HVAC system. In still further features, the events include at least one of (i) a request for heating from a thermostat of the HVAC system and (ii) a request for cooling from the thermostat.

In further features, the electrical sensor data includes current and voltage. In yet further features, the electrical sensor data includes power and power factor. In still further features, the electrical sensor data includes frequency domain current data. In further features, the electrical sensor data includes time domain current data having a first resolution, and the frequency domain current data was generated by the local device based on time domain current data having a second resolution higher than the first resolution. In yet further features, the data includes air temperature sensor data and refrigerant temperature sensor data. In still further features, the data Includes air pressure sensor data. In further features, the data includes refrigerant pressure sensor data.

In yet further features, the method further includes providing aggregated and anonymized data to original equipment manufacturers of HVAC equipment. In still further features, the aggregated and anonymized data includes system efficiency data. In further features, the aggregated and anonymized data includes repair data.

In yet further features, the method further includes comparing received sensor data from before a repair was performed with received sensor data from after the repair was performed. In still further features, the method further includes informing the customer of a result of the comparison. In further features, the method further includes providing a graph of operating parameters of the HVAC system including a time period before the repair was performed and a time period after the repair was performed.

In yet further features, the method further includes notifying a technician of the identified problems and the predicted faults. The technician analyzes the identified problems and the predicted faults before information is provided to the customer. In still further features, the method further includes providing contact information for the technician to an HVAC contractor to allow the HVAC contractor to discuss the identified problems and the predicted faults with the technician.

In further features, the method further includes selectively providing, to the customer, a recommendation to replace a consumable of the HVAC system. In yet further features, the consumable is an air filter. In still further features, the method further includes shipping the consumable to the building. In further features, the method further includes directing an HVAC contractor to deliver the consumable to the building. In yet further features, the method further includes selectively providing, to at least one of an HVAC contractor or the customer, a recommendation to perform preventative maintenance. In still further features, the preventative maintenance includes one or more of cleaning evaporator coils of the HVAC system and cleaning condenser coils of the HVAC system.

In further features, the method further includes, in response to identified problems and predicted faults: identifying faulty elements most likely to cause the identified problems and predicted faults; estimating a repair cost for the faulty elements; estimating a replacement cost for at least a subsystem of the HVAC system; and providing a graphical interface to the customer including the repair cost and the replacement cost. In yet further features, the graphical interface includes a repair history of the HVAC system. In still further features, the graphical interface includes an estimation of utility costs (i) after repairing the HVAC system and (ii) after replacing the HVAC system.

In further features, the method further includes: providing a graphical interface to the customer; and in the graphical interface, displaying a timeline of operating parameters of the HVAC system. The operating parameters are obtained from the stored data. In yet further features, the operating parameters are calculated from the stored data using one or more mathematical functions. In still further features, the method further includes, in the graphical interface, displaying the timeline with graphical data.

In further features, the method further includes, in the graphical interface, displaying the timeline with textual data. In yet further features, the method further includes, in the graphical interface, displaying raw numbers from the stored data. In still further features, the local device was installed in the HVAC system at a first point in time, and the stored data covers from the first point in time to a present point in time. In further features, the method further includes allowing the customer to zoom in on a selected time period of the stored data.

A monitoring system for a heating, ventilation, or air conditioning (HVAC) system in a residential or commercial building is disclosed. An air handler monitor module is installed proximate to an air handler unit of the HVAC system. The air handler monitor module includes: a differential pressure sensor that measures a pressure differential between a supply air plenum of the HVAC system and a return air plenum of the HVAC system; a first air temperature sensor that measures a temperature of the supply air plenum; a second air temperature sensor that measures a temperature of the return air plenum; a first refrigerant temperature sensor that measures a temperature of refrigerant in a liquid line leading to an expansion valve of the HVAC system; a second refrigerant temperature sensor that measures a temperature of refrigerant in a suction line leading to a compressor of the HVAC system; a first current transformer that measures current supplied to the air handler unit; and a first voltage transformer that provides operating power to the air handler monitor module. The air handler monitor module measures a voltage received from the first voltage transformer. The air handler monitor module determines a power factor of power provided to the air handling unit. The air handler monitor module measures values of control lines controlled by a thermostat of the HVAC system. The air handler monitor module converts measured current data from time domain current data to frequency domain current data. A condensing monitor module is installed proximate to a condensing unit of the HVAC system. The condensing unit includes the compressor, and the condensing monitor module includes: a second current transformer that measures current supplied to the condensing unit; and a second voltage transformer that provides operating power to the condensing monitor module. The condensing monitor module measures a voltage received from the second voltage transformer. The condensing monitor module determines a power factor of power provided to the condensing unit. The condensing monitor module transmits the measured current, the measured voltage, and the determined power factor to the air handler monitor module over one or more of the control lines. The air handler monitor module transmits data to a remote monitoring server via a wireless connection, compliant with IEEE 802.11, to an access point in the building. The transmitted data includes the measured temperatures, the measured voltages, the measured differential pressure, the determined power factors, the frequency domain current data, and a subset of the time domain current data. The time domain current data has a first resolution and the subset of the time domain current data has a second resolution that is lower than the first resolution.

A heating, ventilation, or air conditioning (HVAC) analysis system is disclosed. The HVAC analysis system includes: a data receiver module configured to receive sensor data from an HVAC system installed in a building; a data store module configured to record the received sensor data; a fault module configured to identify faulty elements of the HVAC system in response to the recorded sensor data; a repair estimation module configured to estimate a repair cost for the faulty elements; a replace estimation module configured to estimate a replacement cost for at least a subsystem of the HVAC system; and a data formatter module configured to supply the repair cost and the replacement cost to a user interface provided to a customer corresponding to the building.

A method of analyzing a heating, ventilation, or air conditioning (HVAC) system installed in a building is disclosed. The method includes: receiving sensor data from the HVAC system; recording the received sensor data; identifying faulty elements of the HVAC system in response to the recorded sensor data; estimating a repair cost for the faulty elements; estimating a replacement cost for at least a subsystem of the HVAC system; providing a graphical interface to a customer corresponding to the building; and in the graphical interface, displaying the repair cost and the replacement cost.

A method of monitoring a heating, ventilation, or air conditioning (HVAC) system installed in a residential or commercial building is disclosed. The method includes: receiving sensor data from the HVAC system, wherein the received sensor data includes electrical sensor data including at least one of current or power; recording the received sensor data; providing a graphical interface to a customer corresponding to the building; and, in the graphical interface, displaying a timeline of operating parameters of the HVAC system, wherein the operating parameters are obtained from the recorded sensor data.

BRIEF DESCRIPTION OF THE DRAWINGS

The present disclosure will become more fully understood from the detailed description and the accompanying drawings, wherein:

FIGS. 12A and 12B are, for indoor and outdoor units, respectively, non-exhaustive listings of example problems that can be detected and/or predicted according to the present disclosure.

In the drawings, reference numbers may be reused to identify similar and/or identical elements.

DETAILED DESCRIPTION

Figure 1:
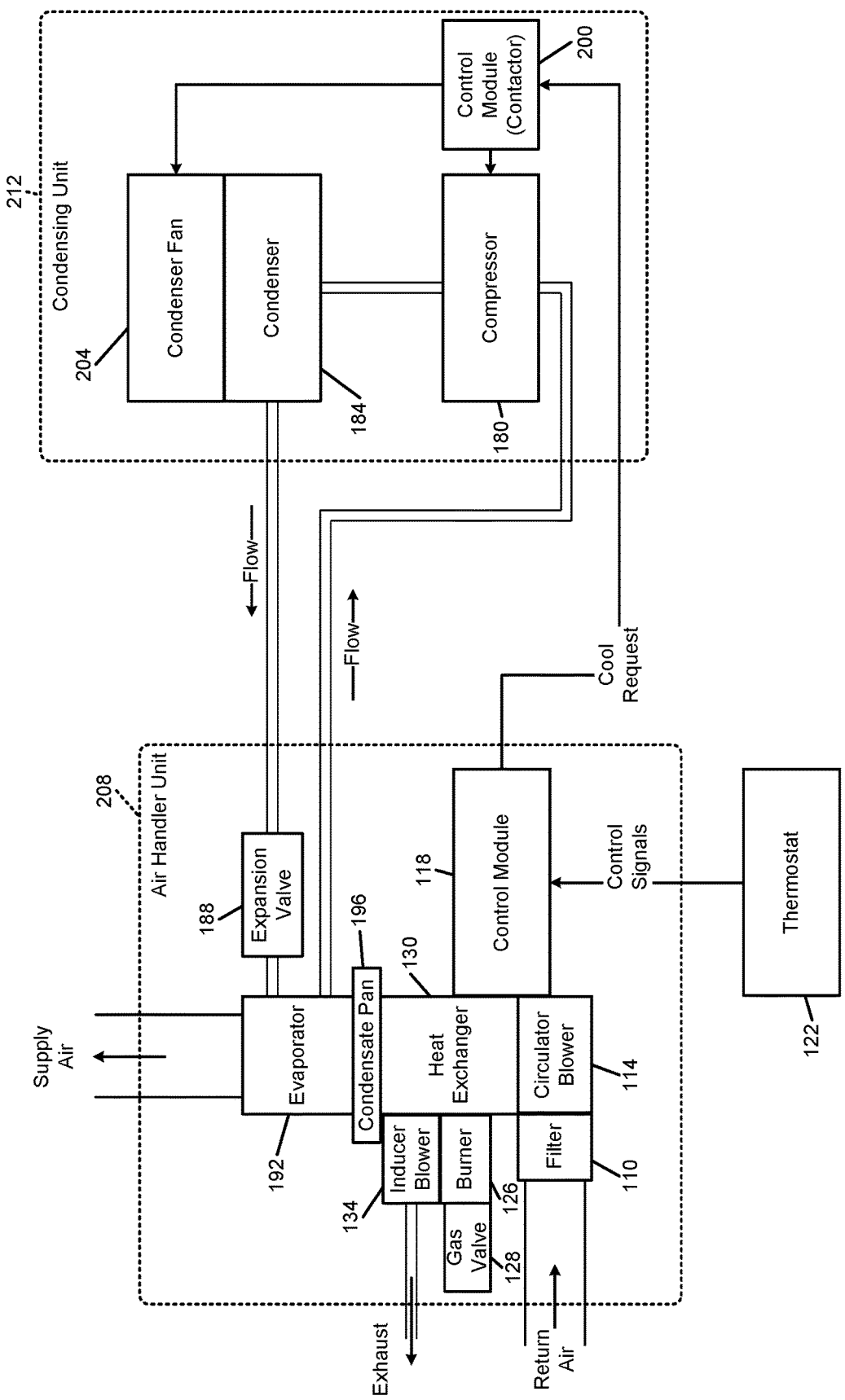
FIG. 1 is a block diagram of an example HVAC system according to the prior art.

This application is co-pending with U.S. application Ser. No. 13/407,180, filed on Feb. 28, 2012 and published as U.S. Pub. No. 2012/0221150, which claims priority to U.S. Provisional Application No. 61/447,681, filed on Feb. 28, 2011, and U.S. Provisional Application No. 61/548,009, filed on Oct. 17, 2011. The entire disclosures of the above applications are incorporated herein by reference.

According to the present disclosure, sensing/monitoring modules can be integrated with a residential or light commercial HVAC (heating, ventilation, or air conditioning) system. As used in this application, the term HVAC can encompass all environmental comfort systems in a building, including heating, cooling, humidifying, and dehumidifying, and covers devices such as furnaces, heat pumps, humidifiers, dehumidifiers, and air conditioners. The term HVAC is a broad term, in that an HVAC system according to this application does not necessarily include both heating and air conditioning, and may instead have only one or the other.

In split HVAC systems with an air handler unit (often, indoors) and a condensing unit (often, outdoors), an air handler monitor module and a condensing monitor module, respectively, can be used. The air handler monitor module and the condensing monitor module may be integrated by the manufacturer of the HVAC system, may be added at the time of the installation of the HVAC system, and/or may be retrofitted to an existing system.

The air handler monitor and condensing monitor modules monitor operating parameters of associated components of the HVAC system. For example, the operating parameters may include power supply current, power supply voltage, operating and ambient temperatures, fault signals, and control signals. The air handler monitor and condensing monitor modules may communicate data between each other, while one or both of the air handler monitor and condensing monitor modules uploads data to a remote location. The remote location may be accessible via any suitable network, including the Internet.

The remote location includes one or more computers, which will be referred to as servers. The servers execute a monitoring system on behalf of a monitoring company. The monitoring system receives and processes the data from the air handler monitor and condensing monitor modules of customers who have such systems installed. The monitoring system can provide performance information, diagnostic alerts, and error messages to a customer and/or third parties, such as a designated HVAC contractor.

The air handler monitor and condensing monitor modules may each sense an aggregate current for the respective unit without measuring individual currents of individual components. The aggregate current data may be processed using frequency domain analysis, statistical analysis, and state machine analysis to determine operation of individual components based on the aggregate current data. This processing may happen partially or entirely in a server environment, remote from the customer's building or residence.

Based on measurements from the air handler monitor and condensing monitor modules, the monitoring company can determine whether HVAC components are operating at their peak performance and can advise the customer and the contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to minimize damage of HVAC components and/or prevent water damage. The contractor can also be notified that a service call will be required. Depending on the contractual relationship between the customer and the contractor, the contractor may immediately schedule a service call to the building.

The monitoring system may provide specific information to the contractor, including identifying information of the customer's HVAC system, including make and model numbers, as well as indications of the specific part numbers that appear to be failing. Based on this information, the contractor can allocate the correct repair personnel that have experience with the specific HVAC system and/or component. In addition, the service technician is able to bring replacement parts, avoiding return trips after diagnosis.

Depending on the severity of the failure, the customer and/or contractor may be advised of relevant factors in determining whether to repair the HVAC system or replace some or all of the components of the HVAC system. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of the HVAC system. For example, failure of heat in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment upon installation and/or applying surcharges to repairs and service visits.

For the air handler monitor and condensing monitor modules, the monitoring company or contractor may charge the customer the equipment cost, including the installation cost, at the time of installation and/or may recoup these costs as part of the monthly fee. Alternatively, rental fees may be charged for the air handler monitor and condensing monitor modules, and once the monitoring service is stopped, the air handler monitor and condensing monitor modules may be returned.

The monitoring service may allow the customer and/or contractor to remotely monitor and/or control HVAC components, such as setting temperature, enabling or disabling heating and/or cooling, etc. In addition, the customer may be able to track energy usage, cycling times of the HVAC system, and/or historical data. Efficiency and/or operating costs of the customer's HVAC system may be compared against HVAC systems of neighbors, whose buildings will be subject to the same or similar environmental conditions. This allows for direct comparison of HVAC system and overall building efficiency because environmental variables, such as temperature and wind, are controlled.

The monitoring system can be used by the contractor during and after installation, and during and after repair to verify operation of the air handler monitor and condensing monitor modules, as well as to verify correct installation of the components of the HVAC system. In addition, the customer may review this data in the monitoring system for assurance that the contractor correctly installed and configured the HVAC system. In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

The historical data collected by the monitoring system may allow the contractor to properly specify new HVAC components and to better tune configuration, including dampers and set points of the HVAC system. The information collected may be helpful in product development and assessing failure modes. The information may be relevant to warranty concerns, such as determining whether a particular problem is covered by a warranty. Further, the information may help to identify conditions, such as unauthorized system modifications, that could potentially void warranty coverage.

Original equipment manufacturers may subsidize partially or fully the cost of the monitoring system and air handler and condensing monitor modules in return for access to this information. Installation and service contractors may also subsidize some or all of these costs in return for access to this information, and for example, in exchange for being recommended by the monitoring system. Based on historical service data and customer feedback, the monitoring system may provide contractor recommendations to customers.

Figure 2:
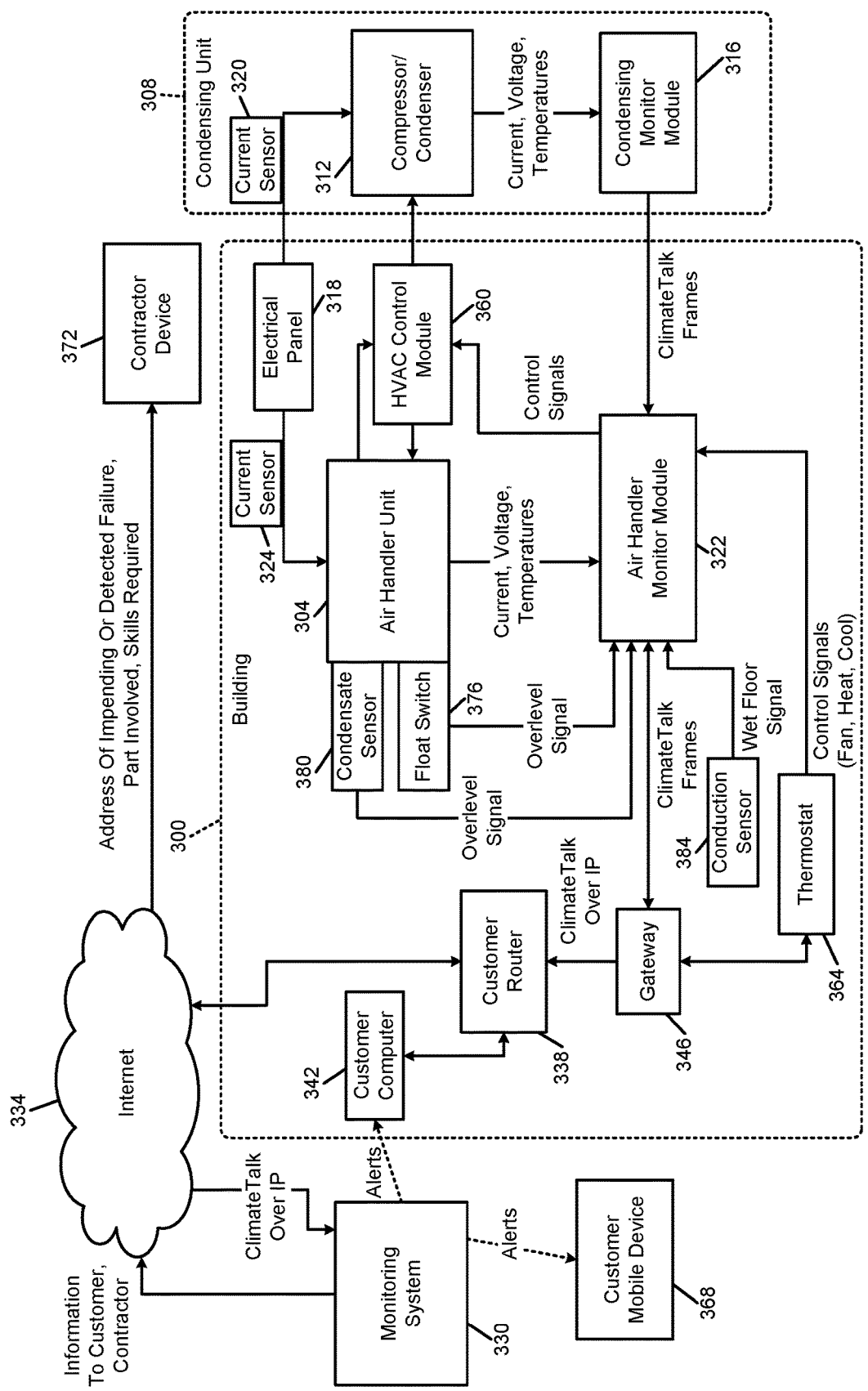
FIG. 2 is a functional block diagram of an example monitoring system showing an HVAC system of a single building.

In FIG. 2, a functional block diagram of an example system installed in a building 300 is presented. In various implementations, the building may be a single-family residence, and the customer is the homeowner, or a lessee or renter. The building 300 includes, for example only, a split system with an air handler unit 304 and a condensing unit 308. The condensing unit 308 includes a compressor, a condenser, a condenser fan, and associated electronics, represented collectively in FIG. 2 as compressor/condenser 312. In many systems, the air handler unit 304 is located inside the building 300, while the condensing unit 308 is located outside the building 300.

The present disclosure is not limited, and applies to other systems including, as examples only, systems where the components of the air handler unit 304 and the condensing unit 308 are located in close proximity to each other or even in a single enclosure. The single enclosure may be located inside or outside of the building 300. In various implementations, the air handler unit 304 may be located in a basement, garage, or attic. In ground source systems, where heat is exchanged with the earth, the air handler unit 304 and the condensing unit 308 may be located near the earth, such as in a basement, crawlspace, garage, or on the first floor, such as when the first floor is separated from the earth by only a concrete slab.

According to the principles of the present disclosure, a condensing monitor module 316 is located within or in close proximity to the condensing unit 308. The condensing monitor module 316 monitors parameters of the condensing unit 308 including current, voltage, and temperatures.

In one implementation, the current measured is a single power supply current that represents the aggregate current draw of the entire condensing unit 308 from an electrical panel 318. A current sensor 320 measures the current supplied to the condensing unit 308 and provides measured data to the condensing monitor module 316. For example only, the condensing unit 308 may receive an AC line voltage of approximately 240 volts. The current sensor 320 may sense current of one of the legs of the 240 volt power supply. A voltage sensor (not shown) may sense the voltage of one or both of the legs of the AC voltage supply. The current sensor 320 may include a current transformer, a current shunt, and/or a hall effect device. In various implementations, a power sensor may be used in addition to or in place of the current sensor 320. Current may be calculated based on the measured power, or profiles of the power itself may be used to evaluate operation of components of the condensing unit 308.

An air handler monitor module 322 monitors the air handler unit 304. For example, the air handler monitor module 322 may monitor current, voltage, and various temperatures. In one implementation, the air handler monitor module 322 monitors an aggregate current drawn by the entire air handler unit 304. When the air handler unit 304 provides power to an HVAC control module 360, the aggregate current includes current drawn by the HVAC control module 360. A current sensor 324 measures current delivered to the air handler unit 304 by the electrical panel 318. The current sensor 324 may be similar to the current sensor 320. Voltage sensors (not shown) may be located near the current sensors 324 and 320. The voltage sensors provide voltage data to the air handler unit 304 and the condensing unit 308.

The air handler monitor module 322 and the condensing monitor module 316 may evaluate the voltage to determine various parameters. For example, frequency, amplitude, RMS voltage, and DC offset may be calculated based on the measured voltage. In situations where 3-phase power is used, the order of the phases may be determined. Information about when the voltage crosses zero may be used to synchronize various measurements and to determine frequency based on counting the number of zero crossings within a predetermined time period.

The air handler unit 304 includes a blower, a burner, and an evaporator. In various implementations, the air handler unit 304 includes an electrical heating device instead of or in addition to the burner. The electrical heating device may provide backup or secondary heat. The condensing monitor module 316 and the air handler monitor module 322 share collected data with each other. When the current measured is the aggregate current draw, in either the air handler monitor module 322 or the condensing monitor module 316, contributions to the current profile are made by each component. It may be difficult, therefore, to easily determine in the time domain how the measured current corresponds to individual components. However, when additional processing is available, such as in a monitoring system, which may include server and other computing resources, additional analysis, such as frequency domain analysis, can be performed.

The frequency domain analysis may allow individual contributions of HVAC system components to be determined. Some of the advantages of using an aggregate current measurement may include reducing the number of current sensors that would otherwise be necessary to monitor each of the HVAC system components. This reduces bill of materials costs, as well as installation costs and potential installation problems. Further, providing a single time domain current stream may reduce the amount of bandwidth necessary to upload the current data. Nevertheless, the present disclosure could also be used with additional current sensors.

Further, although not shown in the figures, additional sensors, such as pressure sensors, may be included and connected to the air handler monitor module 322 and/or the condensing monitor module 316. The pressure sensors may be associated with return air pressure or supply air pressure, and/or with pressures at locations within the refrigerant loop. Air flow sensors may measure mass air flow of the supply air and/or the return air. Humidity sensors may measure relative humidity of the supply air and/or the return air, and may also measure ambient humidity inside or outside the building 300.

In various implementations, the principles of the present disclosure may be applied to monitoring other systems, such as a hot water heater, a boiler heating system, a refrigerator, a refrigeration case, a pool heater, a pool pump/filter, etc. As an example, the hot water heater may include an igniter, a gas valve (which may be operated by a solenoid), an igniter, an inducer blower, and a pump. Aggregate current readings can be analyzed by the monitoring company to assess operation of the individual components of the hot water heater. Aggregate loads, such as the hot water heater or the air handler unit 304, may be connected to an AC power source via a smart outlet, a smart plug, or a high amp load control switch, each of which may provide an indication when a connected device is activated.

In one implementation, which is shown in FIG. 2, the condensing monitor module 316 provides data to the air handler monitor module 322, and the air handler monitor module 322 provides data from both the air handler monitor module 322 and the condensing monitor module 316 to a remote monitoring system 330. The monitoring system 330 is reachable via a distributed network such as the Internet 334. Alternatively, any other suitable network, such as a wireless mesh network or a proprietary network, may be used.

In various other implementations, the condensing monitor module 316 may transmit data from the air handler monitor module 322 and the condensing monitor module 316 to an external wireless receiver. The external wireless receiver may be a proprietary receiver for a neighborhood in which the building 300 is located, or may be an infrastructure receiver, such as a metropolitan area network (such as WiMAX), a WiFi access point, or a mobile phone base station.

In the implementation of FIG. 2, the air handler monitor module 322 relays data between the condensing monitor module 316 and the monitoring system 330. For example, the air handler monitor module 322 may access the Internet 334 using a router 338 of the customer. The customer router 338 may already be present to provide Internet access to other devices within the building 300, such as a customer computer 342 and/or various other devices having Internet connectivity, such as a DVR (digital video recorder) or a video gaming system.

The air handler monitor module 322 may communicate with the customer router 338 via a gateway 346. The gateway 346 translates information received from the air handler monitor module 322 into TCP/IP (Transmission Control Protocol/Internet Protocol) packets and vice versa. The gateway 346 then forwards those packets to the customer router 338. The gateway 346 may connect to the customer router 338 using a wired or wireless connection. The air handler monitor module 322 may communicate with the gateway 346 using a wired or wireless connection. For example, the interface between the gateway 346 and the customer router 338 may be Ethernet (IEEE 802.3) or WiFi (IEEE 802.11).

The interface between the air handler monitor module 322 and the gateway 346 may include a wireless protocol, such as Bluetooth, ZigBee (IEEE 802.15.4), 900 Megahertz, 2.4 Gigahertz, WiFi (IEEE 802.11), and other proprietary or standardized protocols. The air handler monitor module 322 may communicate with the condensing monitor module 316 using wired or wireless protocols. For example only, the air handler monitor module 322 and the condensing monitor module 316 may communicate using power line communications, which may be sent over a line voltage (such as 240 volts) or a stepped-down voltage, such as 24 volts, or a dedicated communications line.

The air handler monitor module 322 and the condensing monitor module 316 may transmit data within frames conforming to the ClimateTalk™ standard, which may include the ClimateTalk Alliance HVAC Application Profile v1.1, released Jun. 23, 2011, the ClimateTalk Alliance Generic Application Profile, v1.1, released Jun. 23, 2011, and the ClimateTalk Alliance Application Specification, v1.1, released Jun. 23, 2011, the entire disclosures of which are hereby incorporated by reference. In various implementations, the gateway 346 may encapsulate ClimateTalk™ frames into IP packets, which are transmitted to the monitoring system 330. The monitoring system 330 then extracts the ClimateTalk™ frames and parses the data contained within the ClimateTalk™ frames. The monitoring system 330 may send return information, including monitoring control signals and/or HVAC control signals, using ClimateTalk™.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah. In addition, other proprietary or standardized wireless or wired protocol may be used between monitor modules, gateway, For example, the interface between the gateway 346 and the customer router 338 may be Ethernet (IEEE 802.3) or WiFi (IEEE 802.11). The interface between the air handler monitor module 322 and the gateway 346 may include a wireless protocol, such as Bluetooth, ZigBee (IEEE 802.15.4), 900 Megahertz, 2.4 Gigahertz, WiFi (IEEE 802.11), and other proprietary or standardized protocols The HVAC control module 360 controls operation of the air handler unit 304 and the condensing unit 308. The HVAC control module 360 may operate based on control signals from a thermostat 364. The thermostat 364 may transmit requests for fan, heat, and cool to the HVAC control module 360. One or more of the control signals may be intercepted by the air handler monitor module 322. Various implementations of interaction between the control signals and the air handler monitor module 322 are shown below in FIGS. 3A-3C.

Additional control signals may be present in various HVAC systems. For example only, a heat pump may include additional control signals, such as a control signal for a reversing valve (not shown). The reversing valve selectively reverses the flow of refrigerant from what is shown in the figures depending on whether the system is heating the building or cooling the building. Further, when the flow of refrigerant is reversed, the roles of the evaporator and condenser are reversed—i.e., refrigerant evaporation occurs in what is labeled the condenser while refrigerant condensation occurs in what is labeled as the evaporator.

The thermostat 364 and/or the HVAC control module 360 may include control signals for secondary heating and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

In various implementations, the thermostat 364 may use the gateway 346 to communicate with the Internet 334. In one implementation, the thermostat 364 does not communicate directly with the air handler monitor module 322 or the condensing monitor module 316. Instead, the thermostat 364 communicates with the monitoring system 330, which may then provide information or control signals to the air handler monitor module 322 and/or the condensing monitor module 316 based on information from the thermostat 364. Using the monitoring system 330, the customer or contractor may send signals to the thermostat 364 to manually enable heating or cooling (regardless of current temperature settings), or to change set points, such as desired instant temperature and temperature schedules. In addition, information from the thermostat 364, such as current temperature and historical temperature trends, may be viewed.

The monitoring system 330 may provide alerts for situations such as detected or predicted failures to the customer computer 342 and/or to any other electronic device of the customer. For example, the monitoring system 330 may provide an alert to a mobile device 368 of the customer, such as a mobile phone or a tablet. The alerts are shown in FIG. 2 with dashed lines indicating that the alerts may not travel directly to the customer computer 342 or the customer mobile device 368 but may traverse, for example, the Internet 334 and/or a mobile provider network (not shown). The alerts may take any suitable form, including text messages, emails, social networking messages, voicemails, phone calls, etc.

The monitoring system 330 also interacts with a contractor device 372. The contractor device 372 may then interface with mobile devices carried by individual contractors. Alternatively, the monitoring system 330 may directly provide alerts to predetermined mobile devices of the contractor. In the event of an impending or detected failure, the monitoring system 330 may provide information regarding identification of the customer, identification of the HVAC system, the part or parts related to the failure, and/or the skills required to perform the maintenance.

In various implementations, the monitoring system 330 may transmit a unique identifier of the customer or the building to the contractor device 372. The contractor device 372 may include a database indexed by the unique identifier, which stores information about the customer including the customer's address, contractual information such as service agreements, and detailed information about the installed HVAC equipment.

The air handler monitor module 322 and the condensing monitor module 316 may receive respective sensor signals, such as water sensor signals. For example, the air handler monitor module 322 may receive signals from a float switch 376, a condensate sensor 380, and a conduction sensor 384. The condensate sensor 380 may include a device as described in commonly assigned patent application Ser. No. 13/162,798, filed Jun. 17, 2011, titled Condensate Liquid Level Sensor and Drain Fitting, the entire disclosure of which is hereby incorporated by reference.

Where the air handler unit 304 is performing air conditioning, condensation occurs and is captured in a condensate pan. The condensate pan drains, often via a hose, into a floor drain or a condensate pump, which pumps the condensate to a suitable drain. The condensate sensor 380 detects whether the drain hose has been plugged, a condition which will eventually cause the condensate pan to overflow, potentially causing damage to the HVAC system and to surrounding portions of the building 300.

The air handler unit 304 may be located on a catch pan, especially in situations where the air handler unit 304 is located above living space of the building 300. The catch pan may include the float switch 376. When enough liquid accumulates in the catch pan, the float switch 376 provides an over-level signal to the air handler monitor module 322.

The conduction sensor 384 may be located on the floor or other surface where the air handler unit 304 is located. The conduction sensor 384 may sense water leaks that are for one reason or another not detected by the float switch 376 or the condensate sensor 380, including leaks from other systems such as a hot water heater.

Figure 3C:
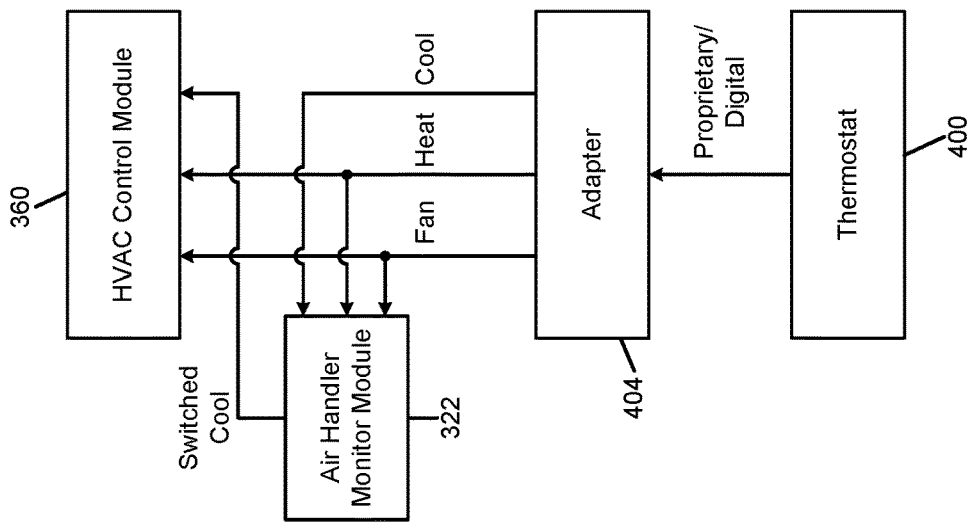
FIGS. 3A-3C are functional block diagrams of control signal interaction with an air handler monitor module.
Figure 3B:
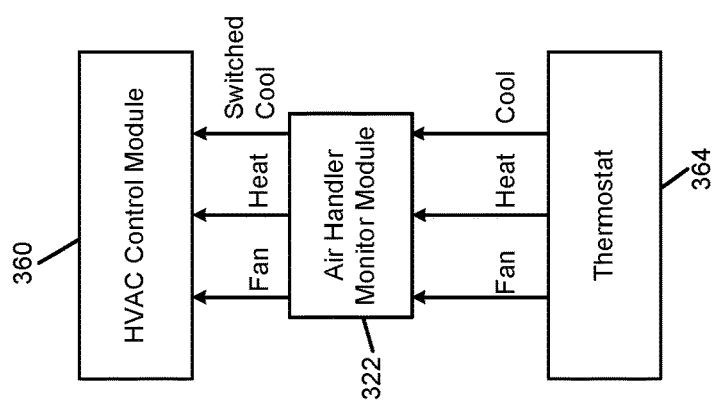
Figure 3A:
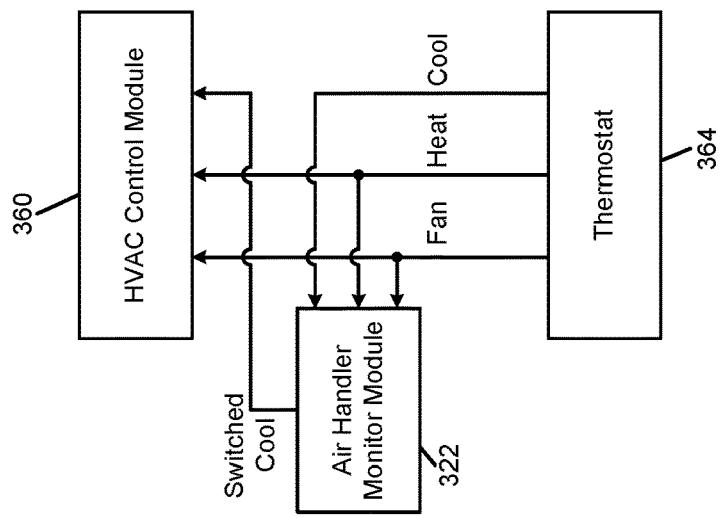

In FIG. 3A, an example of control signal interaction with the air handler monitor module 322 is presented. In this example, the air handler monitor module 322 taps into the fan and heat request signals. For example only, the HVAC control module 360 may include terminal blocks where the fan and heat signals are received. These terminal blocks may include additional connections where leads can be attached between these additional connections and the air handler monitor module 322.

Alternatively, leads from the air handler monitor module 322 may be attached to the same location as the fan and heat signals, such as by putting multiple spade lugs underneath a signal screw head. The cool signal from the thermostat 364 may be disconnected from the HVAC control module 360 and attached to the air handler monitor module 322. The air handler monitor module 322 then provides a switched cool signal to the HVAC control module 360. This allows the air handler monitor module 322 to interrupt operation of the air conditioning system, such as upon detection of water by one of the water sensors. The air handler monitor module 322 may also interrupt operation of the air conditioning system based on information from the condensing monitor module 316, such as detection of a locked rotor condition in the compressor.

In FIG. 3B, the fan, heat, and cool signals are connected to the air handler monitor module 322 instead of to the HVAC control module 360. The air handler monitor module 322 then provides fan, heat, and switched cool signals to the HVAC control module 360. In various other implementations, the air handler monitor module 322 may also switch the fan and/or heat signals.

In FIG. 3C, a thermostat 400 may use a proprietary or digital form of communication instead of discrete request lines such as those used by the thermostat 364. Especially in installations where the thermostat 400 is added after the HVAC control module 360 has been installed, an adapter 404 may translate the proprietary signals into individual fan, heat, and cool request signals. The air handler monitor module 322 can then be connected similarly to FIG. 3A (as shown) or FIG. 3B.

Figure 4A:
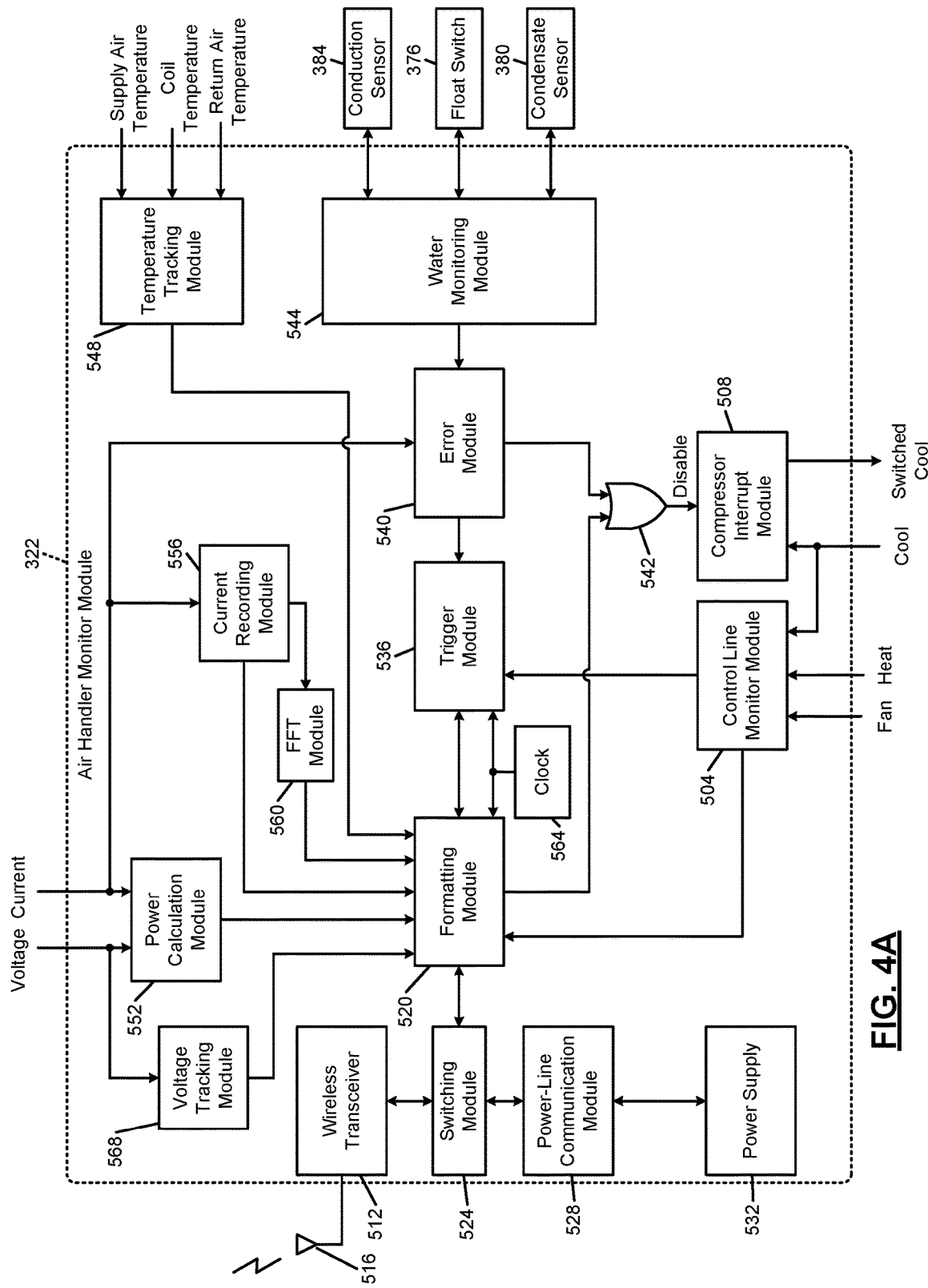
FIG. 4A is a functional block diagram of an example implementation of an air handler monitor module.

In FIG. 4A, a functional block diagram of an example implementation of the air handler monitor module 322 is presented. A control line monitor module 504 receives the fan, heat, and cool request signals. A compressor interrupt module 508 also receives the cool request signal. Based on a disable signal, the compressor interrupt module 508 deactivates the switched cool signal. Otherwise, the compressor interrupt module 508 may pass the cool signal through as the switched cool signal.

The control line monitor module 504 may also receive additional control signals, depending on application, including second stage heat, second stage cool, reversing valve direction, defrost status signal, and dual fuel selection.

A wireless transceiver 512 communicates using an antenna 516 with a wireless host, such as a gateway 346, a mobile phone base station, or a WiFi (IEEE 802.11) or WiMax (IEEE 802.16) base station. A formatting module 520 forms data frames, such as ClimateTalk™ frames, including data acquired by the air handler monitor module 322. The formatting module 520 provides the data frames to the wireless transceiver 512 via a switching module 524.

The switching module 524 receives data frames from the monitoring system 330 via the wireless transceiver 512. Additionally or alternatively, the data frames may include control signals. The switching module 524 provides the data frames received from the wireless transceiver 512 to the formatting module 520. However, if the data frames are destined for the condensing monitor module 316, the switching module 524 may instead transmit those frames to a power-line communication module 528 for transmission to the condensing monitor module 316.

A power supply 532 provides power to some or all of the components of the air handler monitor module 322. The power supply 532 may be connected to line voltage, which may be single phase 120 volt AC power. Alternatively, the power supply 532 may be connected to a stepped-down voltage, such as a 24 volt power supply already present in the HVAC system. When the power received by the power supply 532 is also provided to the condensing monitor module 316, the power-line communication module 528 can communicate with the condensing monitor module 316 via the power supply 532. In other implementations, the power supply 532 may be distinct from the power-line communication module 528. The power-line communication module 528 may instead communicate with the condensing monitor module 316 using another connection, such as the switched cool signal (which may be a switched 24 volt line) provided to the condensing monitor module 316, another control line, a dedicated communications line, etc.

In various implementations, power to some components of the air handler monitor module 322 may be provided by 24 volt power from the thermostat 364. For example only, the cool request from the thermostat 364 may provide power to the compressor interrupt module 508. This may be possible when the compressor interrupt module 508 does not need to operate (and therefore does not need to be powered) unless the cool request is present, thereby powering the compressor interrupt module 508.

Data frames from the condensing monitor module 316 are provided to the switching module 524, which forwards those frames to the wireless transceiver 512 for transmission to the gateway 346. In various implementations, data frames from the condensing monitor module 316 are not processed by the air handler monitor module 322 other than to forward the frames to the gateway 346. In other implementations, the air handler monitor module 322 may combine data gathered by the air handler monitor module 322 with data gathered by the condensing monitor module 316 and transmit combined data frames.

In addition, the air handler monitor module 322 may perform data gathering or remedial operations based on the information from the condensing monitor module 316. For example only, the condensing monitor module 316 may transmit a data frame to the air handler monitor module 322 indicating that the air handler monitor module 322 should monitor various inputs. For example only, the condensing monitor module 316 may signal that the compressor is about to start running or has started running. The air handler monitor module 322 may then monitor related information.

Therefore, the formatting module 520 may provide such a monitoring indication from the condensing monitor module 316 to a trigger module 536. The trigger module 536 determines when to capture data, or if data is being continuously captured, which data to store, process, and/or forward. The trigger module 536 may also receive a signal from an error module 540. The error module 540 may monitor an incoming current and generate an error signal when the current is at too high of a level for too long of a time.

The condensing monitor module 316 may be configured similarly to the air handler monitor module 322. In the condensing monitor module 316, a corresponding error module may determine that a high current level indicates a locked rotor condition of the compressor. For example only, a baseline run current may be stored, and a current threshold calculated by multiplying the baseline run current by a predetermined factor. The locked rotor condition may then be determined when a measurement of current exceeds the current threshold. This processing may occur locally because a quick response time to a locked rotor is beneficial.

The error module 540 may instruct the trigger module 536 to capture information to help diagnose this error and/or may send a signal to the compressor interrupt module 508 to disable the compressor. The disable signal received by the compressor interrupt module 508 may cause disabling of the compressor interrupt module 508 when either the error module 540 or the formatting module 520 indicates that the interruption is required. This logical operation is illustrated with an OR gate 542.

The formatting module 520 may disable the compressor based on an instruction from the monitoring system 330 and/or the condensing monitor module 316. For example, the monitoring system 330 may instruct the formatting module 520 to disable the compressor based on a request by a utility company. For example, during peak load times, the utility company may request air conditioning to be turned off in return for a discount on electricity prices. This shut off can be implemented via the monitoring system 330.

A water monitoring module 544 may monitor the conduction sensor 384, the float switch 376, and the condensate sensor 380. For example, when a resistivity of the conduction sensor 384 decreases below a certain value, which would happen in the presence of water, the water monitoring module 544 may signal to the error module 540 that water is present.

The water monitoring module 544 may also detect when the float switch 376 detects excessive water, which may be indicated by a closing or an opening of the float switch 376. The water monitoring module 544 may also detect when resistivity of the condensate sensor 380 changes. In various implementations, detection of the condensate sensor 380 may not be armed until a baseline current reading is made, such as at the time when the air handler monitor module 322 is powered on. Once the condensate sensor 380 is armed, a change in current may be interpreted as an indication that a blockage has occurred. Based on any of these water signals, the water monitoring module 544 may signal to the error module 540 that the compressor should be disabled.

A temperature tracking module 548 tracks temperatures of one or more HVAC components. For example, the temperature tracking module 548 may monitor the temperature of supply air and of return air. The temperature tracking module 548 may provide average values of temperature to the formatting module 520. For example only, the averages may be running averages. The filter coefficients of the running averages may be predetermined and may be modified by the monitoring system 330.

The temperature tracking module 548 may monitor one or more temperatures related to the air conditioning system. For example, a liquid line provides refrigerant to an expansion valve of the air handler unit 304 from a condenser of the condensing unit 308. A temperature may be measured along the refrigerant line before and/or after the expansion valve. The expansion valve may include, for example, a thermostatic expansion valve, a capillary tube, or an automatic expansion valve.

The temperature tracking module 548 may additionally or alternatively monitor one or more temperatures of an evaporator coil of the air handler unit 304. The temperatures may be measured along the refrigerant line at or near the beginning of the evaporator coil, at or near an end of the evaporator coil, or at one or more midpoints. In various implementations, the placement of the temperature sensor may be dictated by physical accessibility of the evaporator coil. The temperature tracking module 548 may be informed of the location of the temperature sensor. Alternatively, data about temperature location may be stored as part of installation data, which may be available to the formatting module 520 and/or to the monitoring system 330, which can use this information to accurately interpret the received temperature data.

A power calculation module 552 monitors voltage and current. In one implementation, these are the aggregate power supply voltage and the aggregate power supply current, which represents the total current consumed by all of the components of the air handler unit 304. The power calculation module 552 may perform a point-by-point power calculation by multiplying the voltage and current. Point-by-point power values and/or an average value of the point-by-point power is provided to the formatting module 520.

A current recording module 556 records values of the aggregate current over a period of time. The aggregate current may be sensed by a current sensor that is installed within the air handler unit 304 or along the electrical cable providing power to the air handler unit 304 (see current sensor 324 in FIG. 2). For example only, the current sensor may be located at a master switch that selectively supplies the incoming power to the air handler unit 304. Alternatively, the current sensor may be located closer to, or inside of, an electrical distribution panel. The current sensor may be installed in line with one or more of the electrical wires feeding current from the electrical distribution panel to the air handler unit 304.

The aggregate current includes current drawn by all energy-consuming components of the air handler unit 304. For example only, the energy-consuming components can include a gas valve solenoid, an igniter, a circulator blower motor, an inducer blower motor, a secondary heat source, an expansion valve controller, a furnace control panel, a condensate pump, and a transformer, which may provide power to a thermostat. The energy-consuming components may also include the air handler monitor module 322 itself and the condensing monitor module 316.

It may be difficult to isolate the current drawn by any individual energy-consuming component. Further, it may be difficult to quantify or remove distortion in the aggregate current, such as distortion that may be caused by fluctuations of the voltage level of incoming AC power. As a result, processing is applied to the current, which includes, for example only, filtering, statistical processing, and frequency domain processing.

In the implementation of FIG. 4A, the time domain series of currents from the current recording module 556 is provided to a fast Fourier transform (FFT) module 560, which generates a frequency spectrum from the time domain current values. The length of time and the frequency bins used by the FFT module 560 may be configurable by the monitoring system 330. The FFT module 560 may include, or be implemented by, a digital signal processor (DSP). In various implementations, the FFT module 560 may perform a discrete Fourier transform (DFT). The current recording module 556 may also provide raw current values, an average current value (such as an average of absolute values of the current), or an RMS current value to the formatting module 520.

A clock 564 allows the formatting module 520 to apply a time stamp to each data frame that is generated. In addition, the clock 564 may allow the trigger module 536 to periodically generate a trigger signal. The trigger signal may initiate collection and/or storage and processing of received data. Periodic generation of the trigger signal may allow the monitoring system 330 to receive data from the air handler monitor module 322 frequently enough to recognize that the air handler monitor module 322 is still functioning.

A voltage tracking module 568 measures the AC line voltage, and may provide raw voltage values or an average voltage value (such as an average of absolute values of the voltage) to the formatting module 520. Instead of average values, other statistical parameters may be calculated, such as RMS (root mean squared) or mean squared.

Based on the trigger signal, a series of frames may be generated and sent. For example only, the frames may be generated contiguously for 105 seconds and then intermittently for every 15 seconds until 15 minutes has elapsed. Each frame may include a time stamp, RMS voltage, RMS current, real power, average temperature, conditions of status signals, status of liquid sensors, FFT current data, and a flag indicating the source of the trigger signal. Each of these values may correspond to a predetermined window of time, or, frame length.

The voltage and current signals may be sampled by an analog-to-digital converter at a certain rate, such as 1920 samples per second. The frame length may be measured in terms of samples. When a frame is 256 samples long, at a sample rate of 1920 samples per second, there are 7.5 frames every second (or, 0.1333 seconds per frame). Generation of the trigger signal is described in more detail below in FIG. 7. The sampling rate of 1920 Hz has a Nyquist frequency of 960 Hz and therefore allows an FFT bandwidth of up to approximately 960 Hz. An FFT limited to the time span of a single frame may be calculated by the FFT module 560 for each of the frames.

The formatting module 520 may receive a request for a single frame from the monitoring system 330. The formatting module 520 therefore provides a single frame in response to the request. For example only, the monitoring system 330 may request a frame every 30 seconds or some other periodic interval, and the corresponding data may be provided to a contractor monitoring the HVAC system in real time.

Figure 4B:
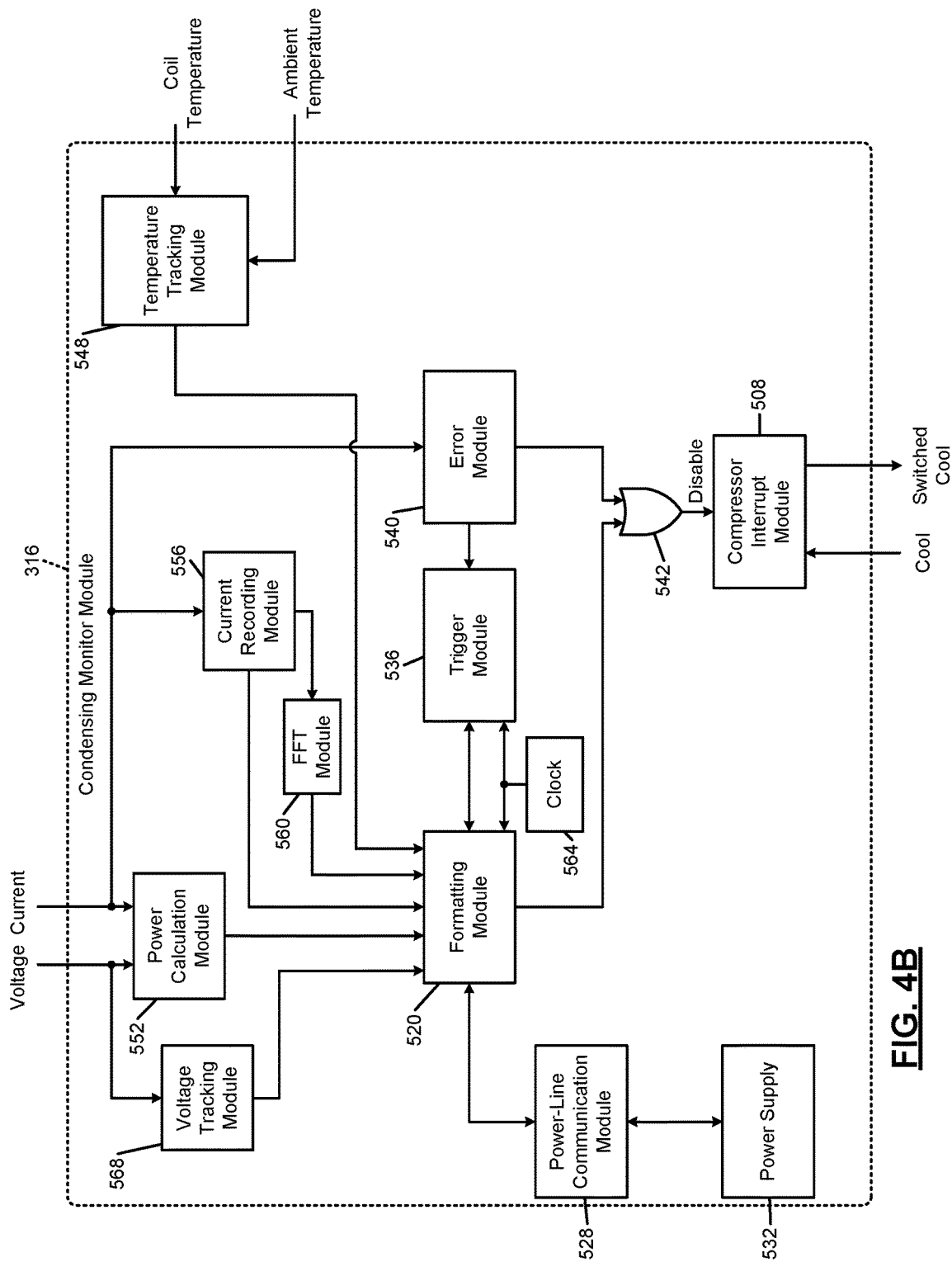
FIG. 4B is a functional block diagram of an example implementation of a condensing monitor module.

In FIG. 4B, an example implementation of the condensing monitor module 316 is shown. Components of the condensing monitor module 316 may be similar to components of the air handler monitor module 322 of FIG. 4A. For example only, the condensing monitor module 316 may include the same hardware components as the air handler monitor module 322, where unused components, such as the wireless transceiver 512, are simply disabled or deactivated. In various other implementations, a circuit board layout may be shared between the air handler monitor module 322 and the condensing monitor module 316, with various locations on the printed circuit board being depopulated (corresponding to components present in the air handler monitor module 322 but not implemented in the condensing monitor module 316).

The current recording module 556 of FIG. 4B receives an aggregate current value (such as from current sensor 320 of FIG. 2) that represents the current to multiple energy-consuming components of the condensing unit 308. The energy-consuming components may include start windings, run windings, capacitors, and contactors/relays for a condenser fan motor and a compressor motor. The energy-consuming components may also include a reversing valve solenoid, a control board, and in some implementations the condensing monitor module 316 itself.

In the condensing monitoring module 316, the temperature tracking module 548 may track an ambient temperature. When the condensing monitor module 316 is located outdoors, the ambient temperature represents an outside temperature. As discussed above, the temperature sensor supplying the ambient temperature may be located outside of an enclosure housing a compressor or condenser. Alternatively, the temperature sensor may be located within the enclosure, but exposed to circulating air. In various implementations the temperature sensor may be shielded from direct sunlight and may be exposed to an air cavity that is not directly heated by sunlight. In various implementations, online (including Internet-based) weather data based on geographical location of the building may be used to determine sun load, ambient air temperature, precipitation, and humidity.

The temperature tracking module 548 may monitor temperatures of the refrigerant line at various points, such as before the compressor (referred to as a suction line temperature), after the compressor (referred to as a compressor discharge temperature), after the condenser (referred to as a liquid line out temperature), and/or at one or more points along the condenser coil. The location of temperature sensors may be dictated by a physical arrangement of the condenser coils. During installation, the location of the temperature sensors may be recorded.

Additionally or alternatively, a database may be available that specifies where temperature sensors are placed. This database may be referenced by installers and may allow for accurate cloud processing of the temperature data. The database may be used for both air handler sensors and compressor/condenser sensors. The database may be prepopulated by the monitoring company or may be developed by trusted installers, and then shared with other installation contractors. The temperature tracking module 548 and/or a cloud processing function may determine an approach temperature, which is a measurement of how close the condenser has been able to make the liquid line out temperature to the ambient air temperature.

Figure 5A:
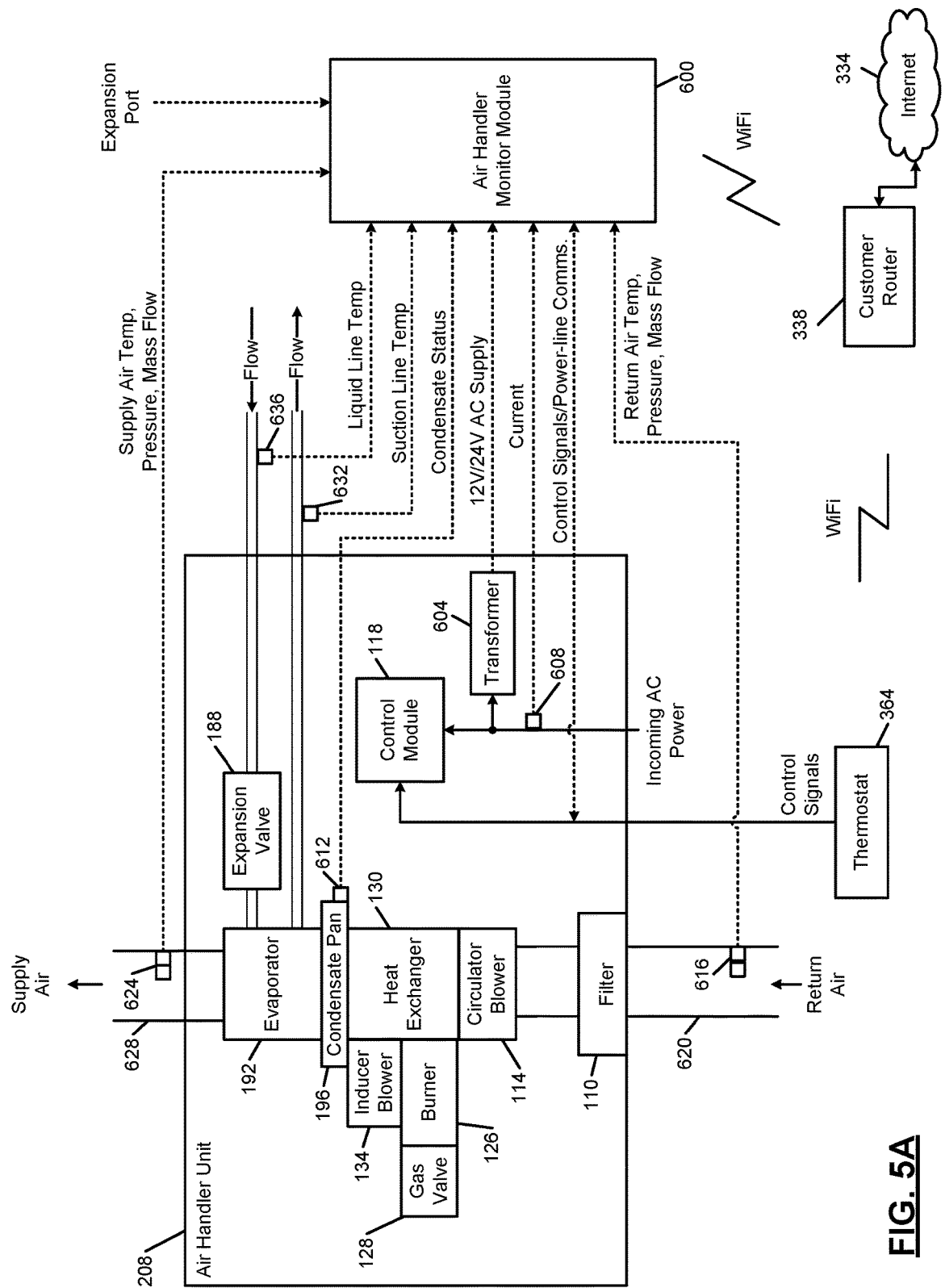
FIG. 5A is a functional block diagram of an example implementation of an air handler monitor module.

In FIG. 5A, the air handler unit 208 of FIG. 1 is shown for reference. Because the systems of the present disclosure can be used in retrofit applications, elements of the air handler unit 208 can remain unmodified. The air handler monitor module 600 and the condensing monitor module 640 can be installed in an existing system without needing to replace the original thermostat 122 shown in FIG. 1. However, to enable certain additional functionality, such as WiFi communication and/or display of alert messages, the thermostat 122 of FIG. 1 may be replaced with the thermostat 364, as shown.

When installing an air handler monitor module 600 in the air handler unit 208, power is provided to the air handler monitor module 600. For example, a transformer 604 can be connected to an AC line in order to provide AC power to the air handler monitor module 600. The air handler monitor module 600 may measure voltage of the incoming line based on this transformed power supply. For example, the transformer 604 may be a 10-to-1 transformer and therefore provide either a 12V or 24V AC supply to the air handler monitor module 600 depending on whether the air handler unit 208 is operating on nominal 120V or nominal 240V power.

A current sensor 608 measures incoming current to the air handler unit 208. The current sensor 608 may include a current transformer that snaps around one power lead of the incoming AC power. For simplicity of illustration, the control module 118 is not shown to be connected to the various components and sensors of the air handler unit 208. In addition, routing of the AC power to various powered components of the air handler unit 208, such as the circulator blower 114, the gas valve 128, and the inducer blower 134, are also not shown for simplicity. The current sensor 608 measures the entire current entering the air handler unit 208 and therefore represents an aggregate current of voltage of each of the current-consuming components of the air handler unit 208.

A condensate sensor 612 measures condensate levels in the condensate pan 196. If a level of condensate gets too high, this may indicate a plug in the condensate pan 196 or a problem with hoses or pumps used for drainage from the condensate pan 196. Although shown in FIG. 5A as being internal to the air handler unit 208, access to the condensate pan 196 and therefore the location of the condensate sensor 612, may be external to the air handler unit 208.

A return air sensor 616 is located in a return air plenum 620. The return air sensor 616 may measure temperature, pressure, and/or mass airflow. In various implementations, a thermistor may be multiplexed as both a temperature sensor and a hot wire mass airflow sensor. In various implementations, the return air sensor 616 is upstream of the filter 110 but downstream of any bends in the return air plenum 620. A supply air sensor 624 is located in a supply air plenum 628. The supply air sensor 624 may measure air temperature, air pressure, and/or mass air flow. The supply air sensor 624 may include a thermistor that is multiplexed to measure both temperature and, as a hot wire sensor, mass airflow. In various implementations, such as is shown in FIG. 5A, the supply air sensor 624 may be located downstream of the evaporator 192 but upstream of any bends in the supply air plenum 628.

The air handler monitor module 600 also receives a suction line temperature from a suction line temperature sensor 632. The suction line temperature sensor 632 measures refrigerant temperature in the refrigerant line between the evaporator 192 and the compressor 180 (shown in FIG. 5B). A liquid line temperature sensor 636 measures refrigerant temperature of refrigerant in a liquid line traveling from the condenser 184 (shown in FIG. 5B) to the expansion valve 188. The air handler monitor module 600 may include one or more expansion ports to allow for connection of additional sensors and/or to allow connection to other devices, such as a home security system, a proprietary handheld device for use by contractors, or a portable computer.

The air handler monitor module 600 also monitors control signals from the thermostat 364. Because one or more of these control signals is also transmitted to the condensing until is also transmitted to the condensing unit 212 (shown in FIG. 5B), these control signals can be used for communication between the air handler monitor module 600 and a condensing monitor module 640 (shown in FIG. 5B). The air handler monitor module 600 communicates with the customer router 338, such as using IEEE 802.11, also known as WiFi. As discussed above although WiFi is discussed in this example, communication according to the present disclosure can be performed over a variety of wired and wireless communication protocols.

The thermostat 364 may also communicate with the customer router 338 using WiFi. In various implementations, the air handler monitor module 600 and the thermostat 364 do not communicate directly; however, because they are both connected through the customer router 338 to a remote monitoring system, the remote monitoring system may allow for control of one based on inputs from the other. Specifically, various faults identified based on information from the air handler monitor module 600 may cause the remote monitoring system to adjust temperature set points of the thermostat 364 and/or display warning or alert messages on the thermostat 364.

Figure 5B:
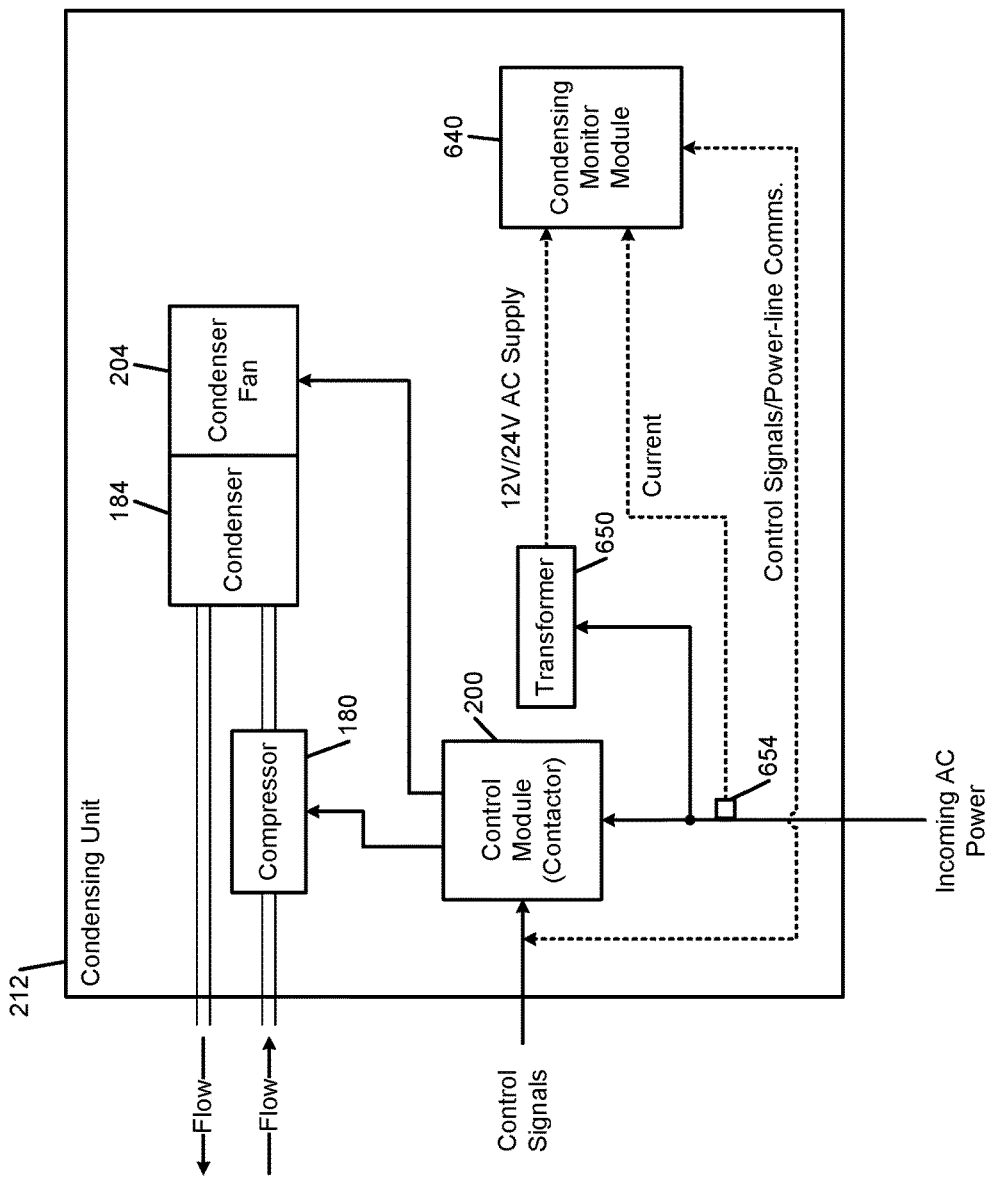
FIG. 5B is a functional block diagram of an example implementation of a condensing monitor module.

In FIG. 5B, the condensing monitor module 640 is installed in the condensing unit 212. A transformer 650 converts incoming AC voltage into a stepped-down voltage for powering the condensing monitor module 640. In various implementations, the transformer 650 may be a 10-to-1 transformer. A current sensor 654 measures current entering the condensing unit 212. The condensing monitor module 640 may also measure voltage from the supply provided by the transformer 650. Based on measurements of the voltage and current, the condensing monitor module 640 may calculate power and/or may determine power factor. As described above, the condensing monitor module 640 communicates with the air handler monitor module 600 using one or more control signals from the thermostat 364. In these implementations, data from the condensing monitor module 640 is transmitted to the air handler monitor module 600, which in turn uploads the data by the customer router 338.

Figure 5C:
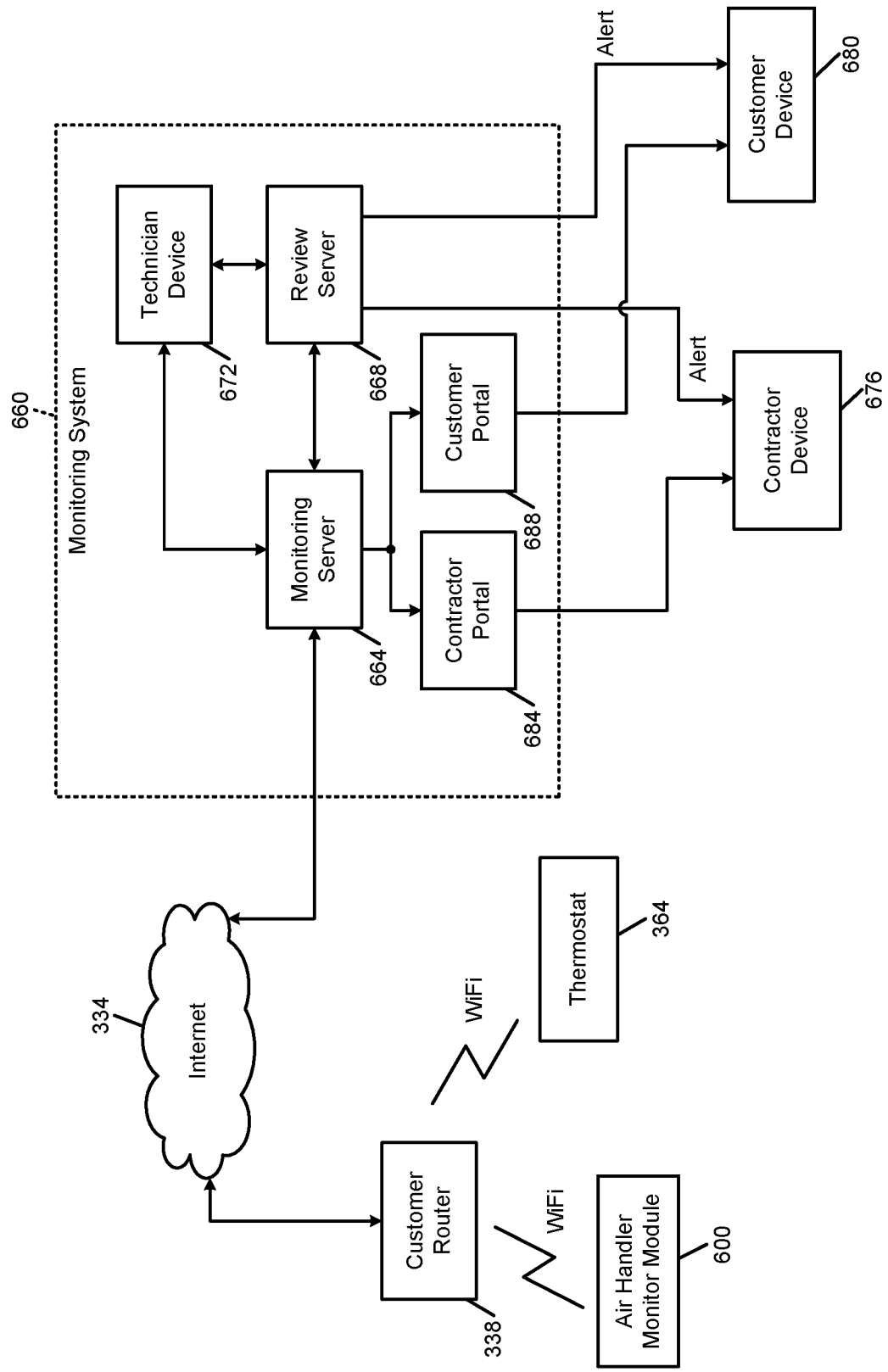
FIG. 5C is a high level functional block diagram of an example implementation of a remote monitoring system.

In FIG. 5C, the air handler monitor module 600 and the thermostat 364 are shown communicating, using the customer router 338, with a monitoring system 660 via the Internet 334. The monitoring system 660 includes a monitoring server 664 which receives data from the air handler monitor module 600 and the thermostat 364 and maintains and verifies network continuity with the air handler monitor module 600. The monitoring server 664 executes various algorithms to identify problems, such as failures or decreased efficiency, and to predict impending faults.

The monitoring server 664 notifies a review server 668 when a problem is identified or a fault is predicted. A technician device 672 operated by a technician is used to review this information and monitor, such as in real-time, data from the air handler monitor module 600 via the monitoring server 664. The technician using the technician device 672 verifies the problem or fault and assuming that the problem or fault is either already present or impending, instructs the review server 668 to send an alert to either or both of a contractor device 676 or a customer device 680. In various implementations, minor problems may be reported to the contractor device 676 only so as not to alarm the customer or inundate the customer with alerts. In various implementations, the technician device 672 may be remote from the monitoring system 660 but connected via a wide area network. For example only, the technician device may include a computing device such as a laptop, desktop, or tablet.

With the contractor device 676, the contractor can access a contractor portal 684, which provides historical and real-time data from the air handler monitor module 600. The contractor using the contractor device 676 may also contact the technician using the technician device 672. The customer using the customer device 680 may access a customer portal 688 in which a graphical view of the system status as well as alert information is shown. The contractor portal 684 and the customer portal 688 may be implemented in a variety of ways according to the present disclosure, including as an interactive web page, a computer application, and/or an app for a smartphone or tablet.

In various implementations, data shown by the customer portal may be more limited and/or more delayed when compared to data visible in the contractor portal 684. In various implementation, the contractor device 676 can be used to request data from the air handler monitor module 600, such as when commissioning a new installation.

Figure 6A:
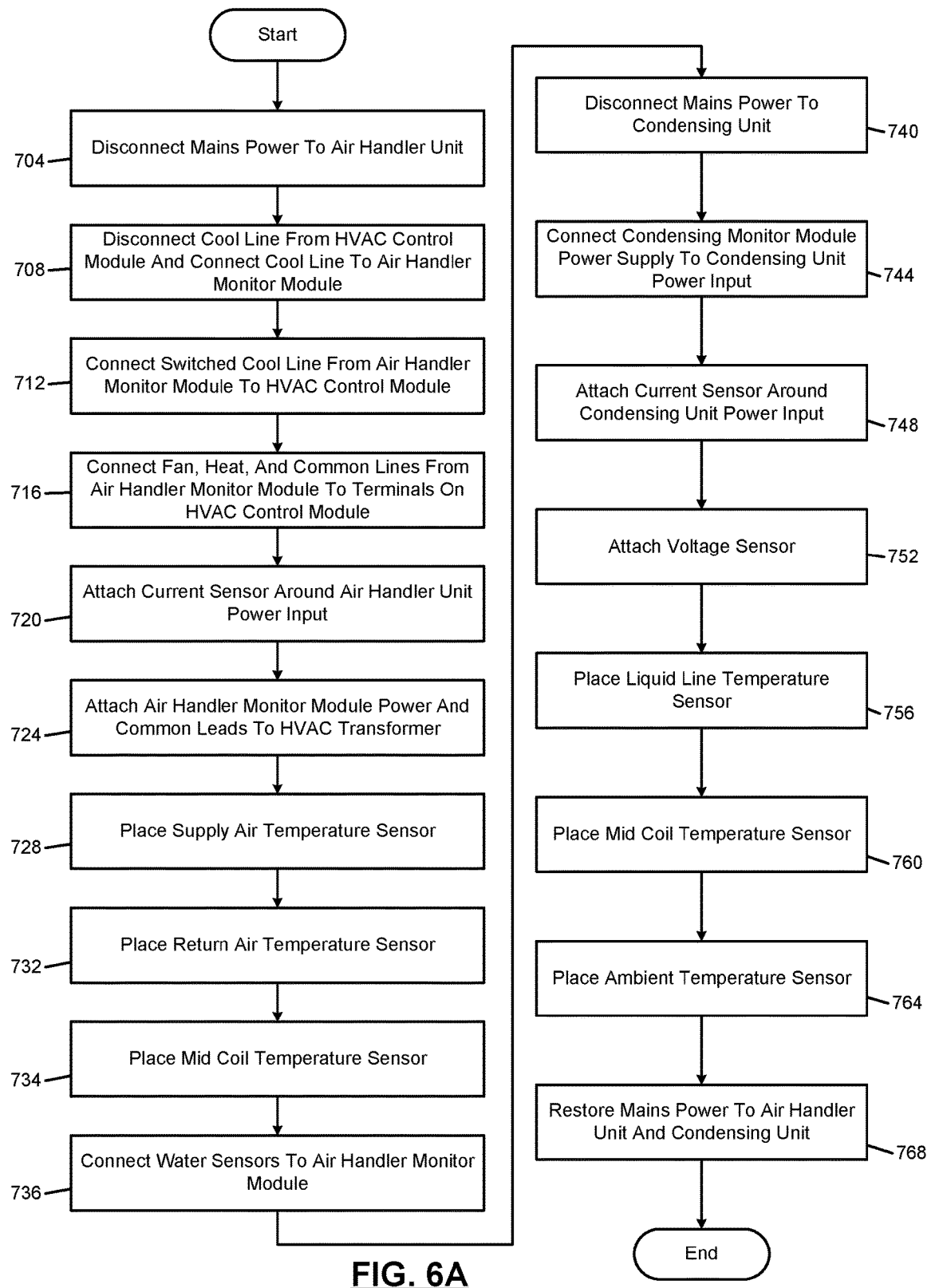
FIGS. 6A and 6B are flowcharts depicting brief overviews of example installation procedures in retrofit applications.

In FIG. 6A, a brief overview of an example monitoring system installation, such as in a retrofit application, is presented. Although FIGS. 6 and 7 are drawn with arrows indicating a specific order of operation, the present disclosure is not limited to this specific order. At 704, mains power to the air handler is disconnected. If there is no outside disconnect for the mains power to the compressor/condenser unit, mains power to the compressor/condenser unit should also be disconnected at this point. At 708, the cool line is disconnected from the HVAC control module and connected to the air handler monitor module. At 712, the switched cool line from the air handler monitor module is connected to the HVAC control module where the cool line was previously connected.

At 716, fan, heat, and common lines from the air handler monitor module are connected to terminals on the HVAC control module. In various implementations, the fan, heat, and common lines originally going to the HVAC control module may be disconnected and connected to the air handler monitor module. This may be done for HVAC control modules where additional lines cannot be connected in parallel with the original fan, heat, and common lines.

At 720, a current sensor such as a snap-around current transformer, is connected to mains power to the HVAC system. At 724, power and common leads are connected to the HVAC transformer, which may provide 24 volt power to the air handler monitor module. In various implementations, the common lead may be omitted, relying on the common lead discussed at 716. Continuing at 728, a temperature sensor is placed in the supply air duct work and connected to the air handler monitor module. At 732, a temperature sensor is placed in the return air duct work and connected to the air handler monitor module. At 734, a temperature sensor is placed in a predetermined location, such as a middle loop, of the evaporator coil. At 736, water sensors are installed and connected to the air handler monitor module.

At 740, mains power to the compressor/condenser unit is disconnected. At 744, the power supply of the condensing monitor module is connected to the compressor/condenser unit's input power. For example, the condensing monitor module may include a transformer that steps down the line voltage into a voltage usable by the condensing monitor module. At 748, a current sensor is attached around the compressor/condenser unit's power input. At 752, a voltage sensor is connected to the compressor/condenser unit's power input.

At 756, a temperature sensor is installed on the liquid line, such as at the input or the output to the condenser. The temperature sensor may be wrapped with insulation to thermally couple the temperature sensor to the liquid in the liquid line and thermally isolate the temperature sensor from the environment. At 760, the temperature sensor is placed in a predetermined location of the condenser coil and insulated. At 764, the temperature sensor is placed to measure ambient air. The temperature sensor may be located outside of the condensing unit 308 or in a space of the condensing unit 308 in which outside air circulates. At 768, mains power to the air handler and the compressor/condenser unit is restored.

Figure 6B:
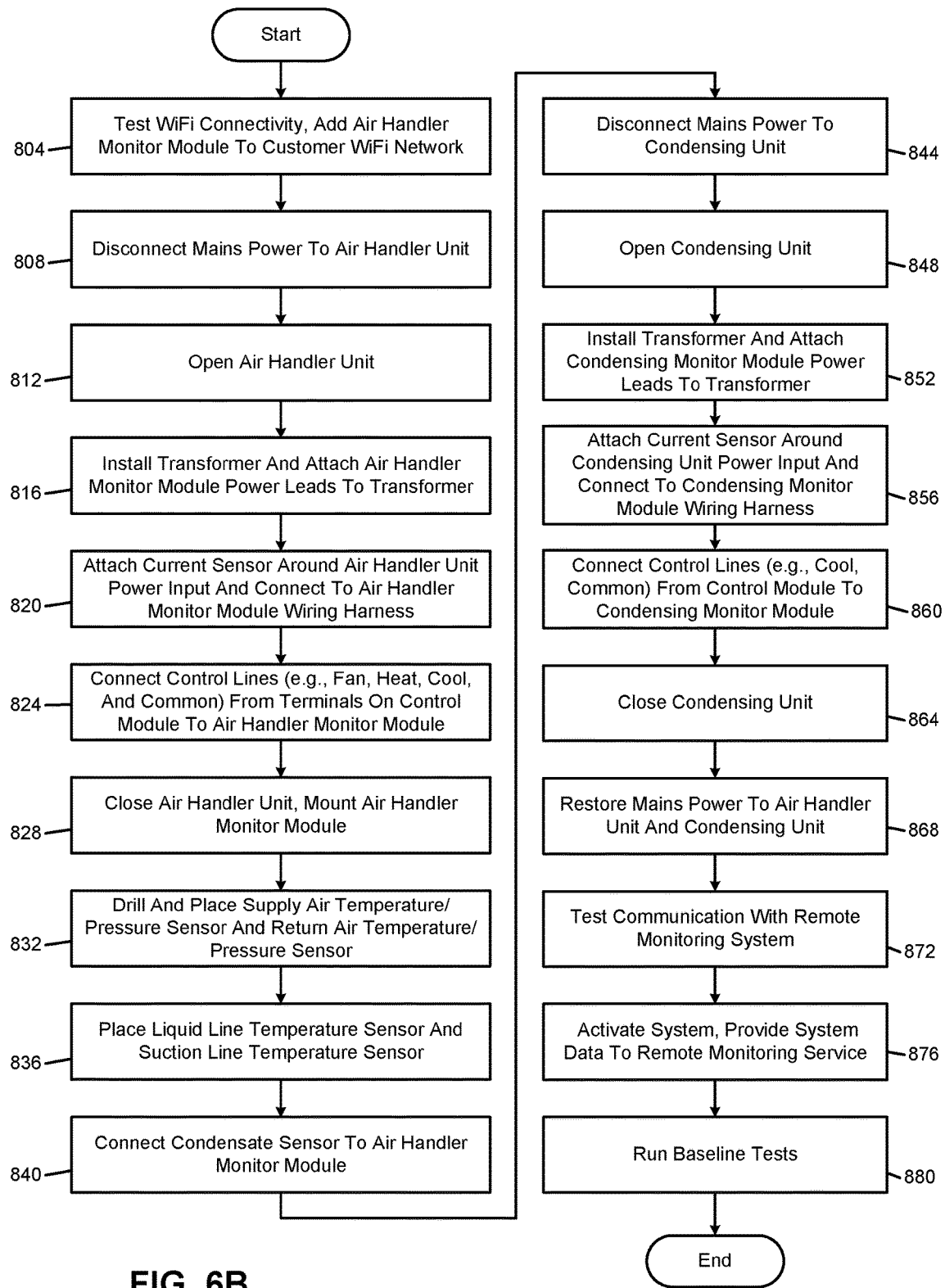
Figure 7:
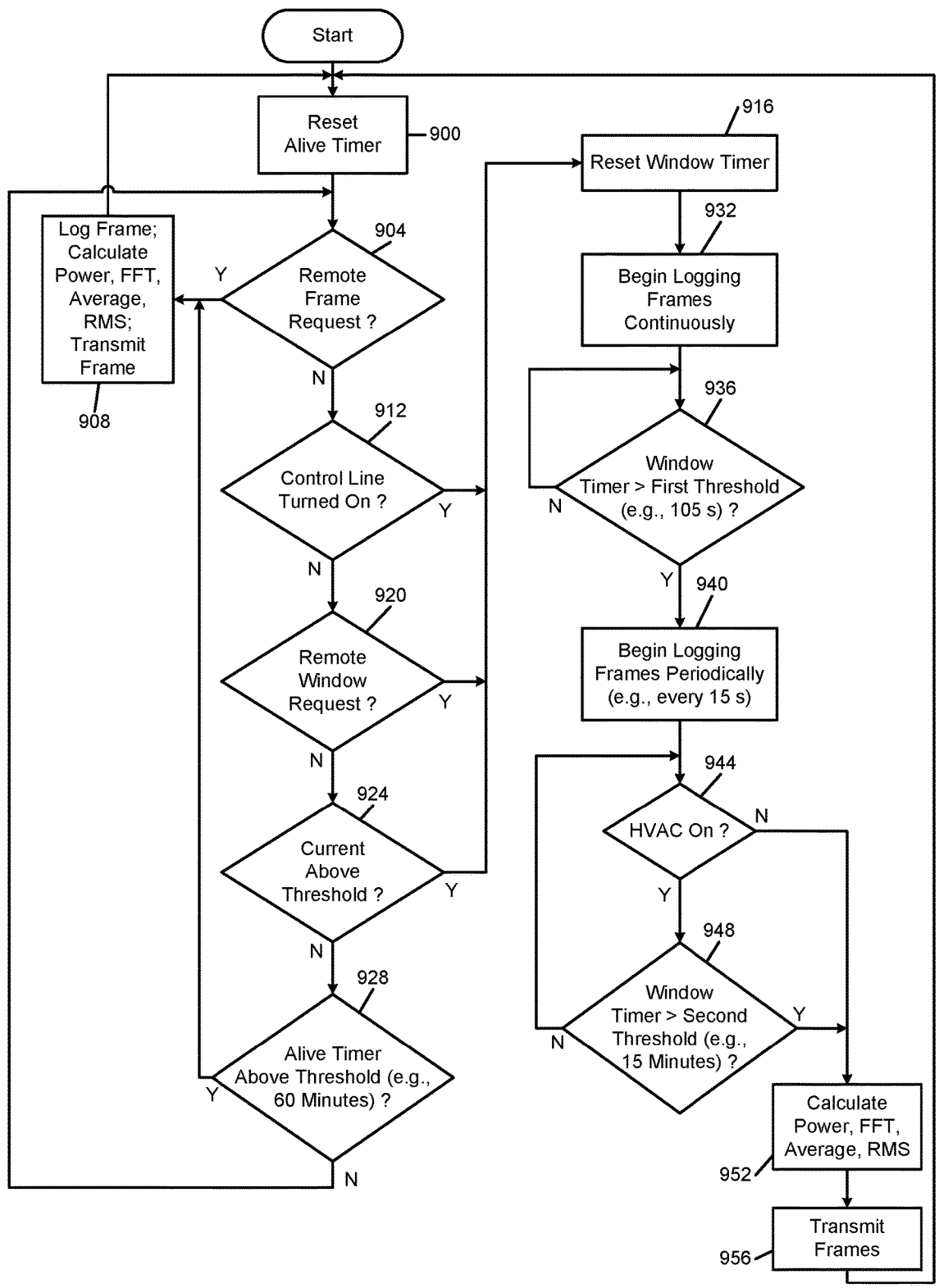
FIG. 7 is a flowchart of example operation in capturing frames of data.

In FIG. 6B, an overview of an example installation process for an air handler monitor module (e.g., the air handler monitor module 600 of FIG. 5A) and a condensing monitor module (e.g., the condensing monitor module 640 of FIG. 5B) begins at 804, where WiFi connectivity is tested. For example only, a contractor may use a portable device, such as a laptop, tablet, or smartphone to assess the customers WiFi. If necessary, firmware updates to the customer router may be necessary.

In addition, it may be necessary for the customer to upgrade their router and/or install a second router or wireless access point to allow for a strong signal to be received by the air handler monitor module. The remaining installation may be suspended until a viable WiFi signal has been established or the installation may proceed and commissioning of the system and checking network connectivity can be tested remotely or in person once a strong WiFi signal is available to the air handler monitor module. In various implementations, the air handler monitor module may include a wired network port, which may allow for a run of network cable to provide network access to the air handler monitor module for purposes of testing. The cable can be removed after the system has been commissioned with the expectation that a strong WiFi signal will subsequently be provided.

For example only, power may be supplied to the air handler monitor module to ensure that WiFi connectivity is not only present, but compatible with the air handler monitor module. The power may be temporary, such as a wall-wart transformer or a battery pack, which does not remain with the installed air handler monitor module. In various implementations, the air handler monitor module may be used to test WiFi connectivity before attempting any signal detection or troubleshooting with another device, such as a portable computer.

Control continues at 808, where mains power is disconnected to the air handler unit. If access to an electrical panel possible, mains power to both the air handler unit and the condensing unit should be removed as soon as possible in the process. At 812, the installer opens the air handler unit and at 816, a voltage transformer is installed, connected to AC power, and connected to the air handler monitor module. At 820, a current sensor is attached around one lead of the AC power in put to the air handler unit. At 824, control lines including fan, heat, cooling, and common are connected from the existing control module to the air handler monitor module.

In various implementations, the air handler monitor module may be connected in series with one of the control lines, such as the call for cool line. For these implementations, the call for cool line may be disconnected from the preexisting control module and connected to a lead on a wiring harness of the air handler monitor module. Then a second lead on the wiring harness of the air handler monitor module can be connected to the location on the preexisting control module where the call for cool line had previously been connected.

At 828, the air handler unit is closed and the air handler monitor module is mounted to the exterior of the air handler unit, such as with tape and/or magnets. At 832, a supply air sensor is installed in a hole drilled in a supply air plenum. The supply air sensor may be a single physical device that includes a pressure sensor and a temperature sensor. Similarly, a return air sensor is installed in a hole drilled in a return air plenum.

At 836, a liquid line temperature sensor is placed on the liquid refrigerant line leading to the evaporator, and a suction line temperature sensor is placed on a suction refrigerant line leading to the compressor. In various implementations, these sensors may be thermally coupled to the respective refrigerant lines using a thermal paste and may be wrapped in an insulating material to minimize the sensors' responsiveness to surrounding air temperature. At 840, a condensate sensor is installed proximate to the condensate pan and connected to the air handler monitor module.

At 844, the installer moves to the condensing unit and disconnects mains power to the condensing unit if not already disconnected. At 848, the installer opens the condensing unit and at 852, the installer installs a voltage transformer connected to AC power and attaches leads from the condensing monitor module to the transformer. At 856, a current sensor is attached around one of the power leads entering the condensing unit. At 860, control lines (including cool and common) from terminals on the existing control board are connected to the condensing monitor module. At 864, the condensing unit is closed and at 868, mains power to the air handler unit and condensing unit is restored.

At 872, communication with the remote monitoring system is tested. Then at 876, the air handler monitor module the condensing monitor module are activated. At this time, the installer can provide information to the remote monitoring system including identification of control lines that were connected to the air handler monitor module and condensing monitor module. In addition, information such as the HVAC system type, year installed, manufacturer, model number, BTU rating, filter type, filter size, tonnage, etc.

In addition, because the condensing unit may have been installed separately from the furnace, the installer may also record and provide to the remote monitoring system the manufacturer and model number of the condensing unit, the year installed, the refrigerant type, the tonnage, etc. At 880, baseline tests are run. For example, this may include running a heating cycle and a cooling cycle, which the remote monitoring system records and uses to identify initial efficiency metrics. Further, baseline profiles for current, power, and frequency domain current can be established. Installation may then be complete.

The installer may collect a device fee, an installation fee, and/or a subscription fee from the customer. In various implementations, the subscription fee, the installation fee, and the device fee may be rolled into a single system fee, which the customer pays upon installation. The system fee may include the subscription fee for a set number of years, such as 1, 2, 5, or 10, or may be a lifetime subscription, which may last for the life of the home or the ownership of the building by the customer.

In FIG. 7, a flowchart depicts example operation in capturing frames of data. Control begins upon startup of the air handler monitor module at 900, where an alive timer is reset. The alive timer ensures that a signal is periodically sent to the monitoring system so that the monitoring system knows that the air handler monitor module is still alive and functioning. In the absence of this signal, the monitoring system 330 will infer that the air handler monitor module is malfunctioning or that there is connectivity issue between the air handler monitor module and the monitoring system.

Control continues at 904, where control determines whether a request for a frame has been received from the monitoring system. If such a request has been received, control transfers to 908; otherwise, control transfers to 912. At 908, a frame is logged, which includes measuring voltage, current, temperatures, control lines, and water sensor signals. Calculations are performed, including averages, powers, RMS, and FFT. Then a frame is transmitted to the monitoring system. In various implementations, monitoring of one or more control signals may be continuous. Therefore, when a remote frame request is received, the most recent data is used for the purpose of calculation.

Control then returns to 900. Referring now to 912, control determines whether one of the control lines has turned on. If so, control transfers to 916; otherwise, control transfers to 920. Although 912 refers to the control line being turned on, in various other implementations, control may transfer to 916 when a state of a control line changes—i.e., when the control line either turns on or turns off. This change in status may be accompanied by signals of interest to the monitoring system. Control may also transfer to 916 in response to an aggregate current of either the air handler unit or the compressor/condenser unit.

At 920, control determines whether a remote window request has been received. If so, control transfers to 916; otherwise, control transfers to 924. The window request is for a series of frames, such as is described below. At 924, control determines whether current is above a threshold, and if so, control transfers to 916; otherwise, control transfers to 928. At 928, control determines whether the alive timer is above a threshold such as 60 minutes. If so, control transfers to 908; otherwise, control returns to 904.

At 916, a window timer is reset. A window of frames is a series of frames, as described in more detail here. At 932, control begins logging frames continuously. At 936, control determines whether the window timer has exceeded a first threshold, such as 105 seconds. If so, control continues at 940; otherwise, control remains at 936, logging frames continuously. At 940, control switches to logging frames periodically, such as every 15 seconds.

Control continues at 944, where control determines whether the HVAC system is still on. If so, control continues at 948; otherwise, control transfers to 952. Control may determine that the HVAC system is on when an aggregate current of the air handler unit and/or of the condensing unit exceeds a predetermined threshold. Alternatively, control may monitor control lines of the air handler unit and/or the condensing unit to determine when calls for heat or cool have ended. At 948, control determines whether the window timer now exceeds a second threshold, such as 15 minutes. If so, control transfers to 952; otherwise, control returns to 944 while control continues logging frames periodically.

At 952, control stops logging frames periodically and performs calculations such as power, average, RMS, and FFT. Control continues at 956 where the frames are transmitted. Control then returns to 900. Although shown at the end of frame capture, 952 and 956 may be performed at various times throughout logging of the frames instead of at the end. For example only, the frames logged continuously up until the first threshold may be sent as soon as the first threshold is reached. The remaining frames up until the second threshold is reached may each be sent out as it is captured.

In various implementations, the second threshold may be set to a high value, such as an out of range high, which effectively means that the second threshold will never be reached. In such implementations, the frames are logged periodically for as long as the HVAC system remains on.

A server of the monitoring system includes a processor and memory, where the memory stores application code that processes data received from the air handler monitor and condensing monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers, which may together operate to receive and process data from the air handler monitor and condensing monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in the monitoring system 330, some or all of these functions may be performed locally using installed equipment and/or customer resources, such as a customer computer.

The servers may store baselines of frequency data for the HVAC system of a building. The baselines can be used to detect changes indicating impending or existing failures. For example only, frequency signatures of failures of various components may be pre-programmed, and may be updated based on observed evidence from contractors. For example, once a malfunctioning HVAC system has been diagnosed, the monitoring system may note the frequency data leading up to the malfunction and correlate that frequency signature with the diagnosed cause of the malfunction. For example only, a computer learning system, such as a neural network or a genetic algorithm, may be used to refine frequency signatures. The frequency signatures may be unique to different types of HVAC systems and/or may share common characteristics. These common characteristics may be adapted based on the specific type of HVAC system being monitored.

The monitoring system may also receive current data in each frame. For example, when 7.5 frames per seconds are received, current data having a 7.5 Hz resolution is available. The current and/or the derivative of this current may be analyzed to detect impending or existing failures. In addition, the current and/or the derivative may be used to determine when to monitor certain data, or points at which to analyze obtained data. For example, frequency data obtained at a predetermined window around a certain current event may be found to correspond to a particular HVAC system component, such as activation of a hot surface igniter.

Components of the present disclosure may be connected to metering systems, such as utility (including gas and electric) metering systems. Data may be uploaded to the monitoring system 330 using any suitable method, including communications over a telephone line. These communications may take the form of digital subscriber line (DSL) or may use a modem operating at least partially within vocal frequencies. Uploading to the monitoring system 330 may be confined to certain times of day, such as at night time or at times specified by the contractor or customer. Further, uploads may be batched so that connections can be opened and closed less frequently. Further, in various implementations, uploads may occur only when a fault or other anomaly has been detected.

Methods of notification are not restricted to those disclosed above. For example, notification of HVAC problems may take the form of push or pull updates to an application, which may be executed on a smart phone or other mobile device or on a standard computer. Notifications may also be viewed using web applications or on local displays, such as the thermostat 364 or other displays located throughout the building or on the air handler monitor module 322 or the condensing monitor module 316.

Figure 8:
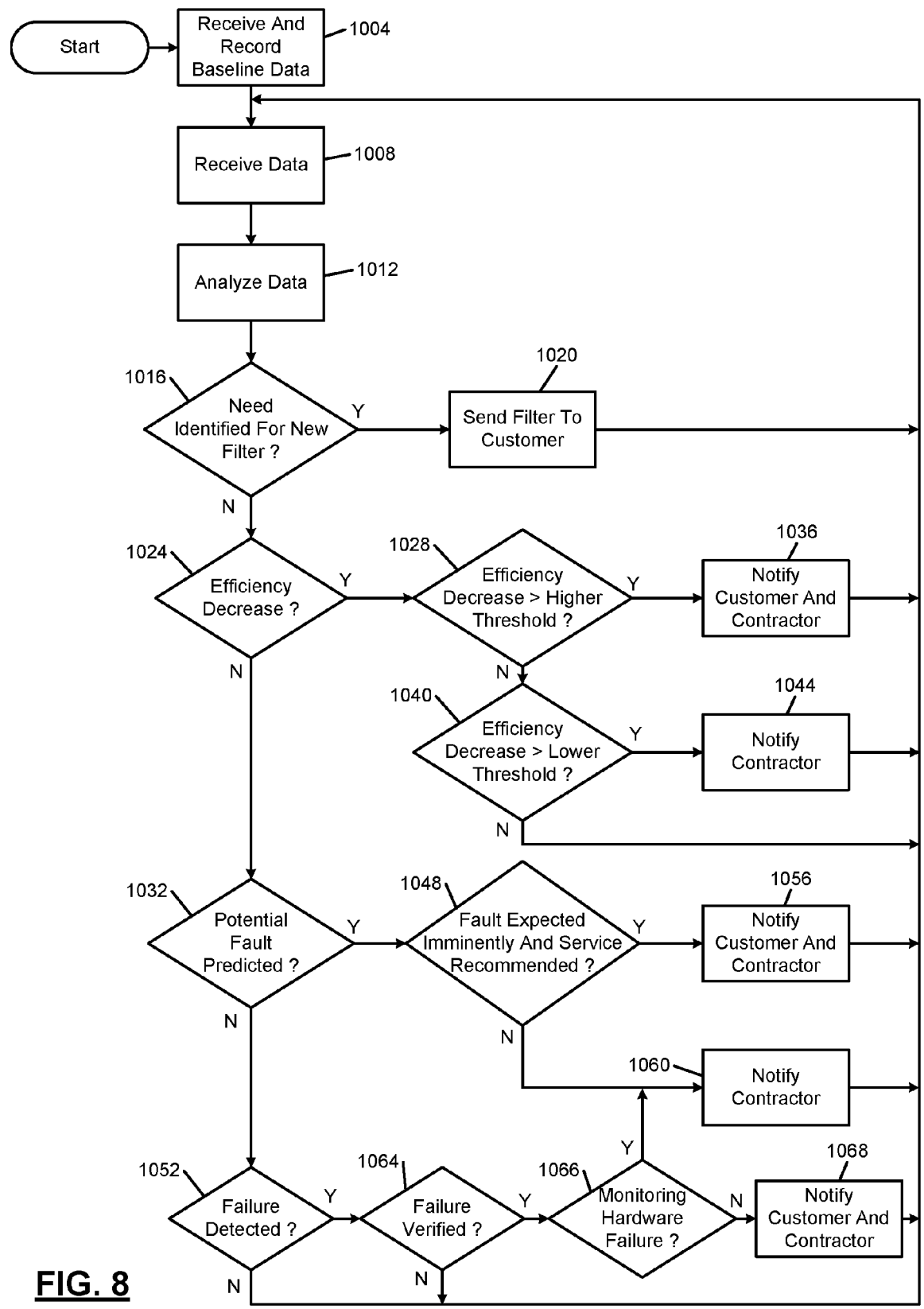
FIG. 8 is an example functional schematic of example HVAC components.

In FIG. 8, control begins at 1004, where data is received and baseline data is recorded. This may occur during the commissioning of a new monitoring system, which may be either in a new HVAC system or a retrofit installation. Control continues at 1008, where data is received from the local devices. At 1012, at the remote monitoring system, the data is analyzed.

At 1016, control determines whether there is a need for a new consumable, such as an air filter or humidifier element. If so, control transfers to 1020; otherwise, control transfers to 1024. At 1020, the consumable is sent to the customer. The air filter may be sent directly to the customer from the operator of the remote monitoring system or a partner company. Alternatively, a designated HVAC contractor may be instructed to send or personally deliver the consumable to the customer. In addition, the HVAC contractor may offer to install the consumable for the customer or may install the consumable as part of a service plan. In situations where the customer has not opted for consumable coverage, the remote monitoring system may instead send an alert to the customer and/or the contractor that a replacement consumable is needed. This alert may be sent out in advance of when the consumable should be replaced to give the customer or contractor sufficient time to acquire and install the consumable. Control then returns to 1008.

At 1024, control determines whether there has been an efficiency decrease. If so, control transfers to 1028; otherwise, control transfers to 1032. At 1028, control determines whether the efficiency decrease is greater than a first threshold. If so, control transfers to 1036; otherwise, control transfers to 1040. This first threshold may be a higher threshold indicating that the efficiency decrease is significant and should be addressed. This threshold may be set based on baseline performance of the customer's system, performance of similar systems in a surrounding area, performance of similar systems throughout a wide geographic area but normalized for environmental parameters, and/or based on manufacturer-supplied efficiency metrics.

At 1036, the customer and designated contractor are notified and control returns to 1008. At 1040, control determines whether the efficiency decrease is greater than a second threshold. This second threshold may be lower than the first threshold and may indicate gradual deterioration of the HVAC system. As a result, if the efficiency decrease is greater than this second threshold, control transfers to 1044; otherwise, control simply returns to 1008. At 1044, the decrease in efficiency may not be significant enough to notify the customer; however, the contractor is notified and control returns to 1008. The contractor may schedule an appointment with the customer and/or may note the decrease in efficiency for the next visit to the customer.

At 1032, control determines whether a potential fault is predicted based on data from the local devices at the customer building. If so, control transfers to 1048; otherwise, control transfers to 1052. At 1048, control determines whether the fault is expected imminently. If so, and if corresponding service is recommended, control transfers to 1056, where the customer and the designated contractor are notified. This may allow the customer to make arrangements with the contractor and/or make arrangements to secure a backup source of heating or cooling. For example only, an imminent fault predicted late at night may be too late for service by the contractor. The customer may therefore plan accordingly for a potentially cold or warm building in the morning and make appropriate arrangements. The prediction of the fault may allow for the contractor to schedule a visit as the contractor opens in the morning. Control then returns to 1008.

If the fault is not expected imminently, or if service is not recommended, at 1048, the contractor may be notified at

1060. The contractor may then schedule a visit to the customer to determine whether a part should be preemptively replaced and to discuss other service options with the customer. Control then returns to 1008. At 1052, if a failure is detected, control transfers to 1064; otherwise, control returns to 1008. At 1064, if the failure is verified, such as through automatic or manual mechanisms, control transfers to 1066; otherwise, control returns to 1008. At 1066, if the failure is determined to be with the monitoring hardware, control transfers to 1060 to notify the contractor; otherwise, the failure is with the HVAC system, and control transfers to 1068. At 1068, the contractor and customer are notified of the failure and control returns to 1008.

In various implementations, the customer may be given the option to receive all data and all alerts sent to the contractor. Although this may be more information than a regular customer needs, certain customers may appreciate the additional data and the more frequent contact. The determinations made in 1028, 1040, 1048, 1064, and 1066 may each be made partially or fully by a technician. This may reduce false positives and confirm correct diagnosis of failures and faults based on the technician's experience with the intricacies of HVAC systems and automated algorithms.

Figure 9:
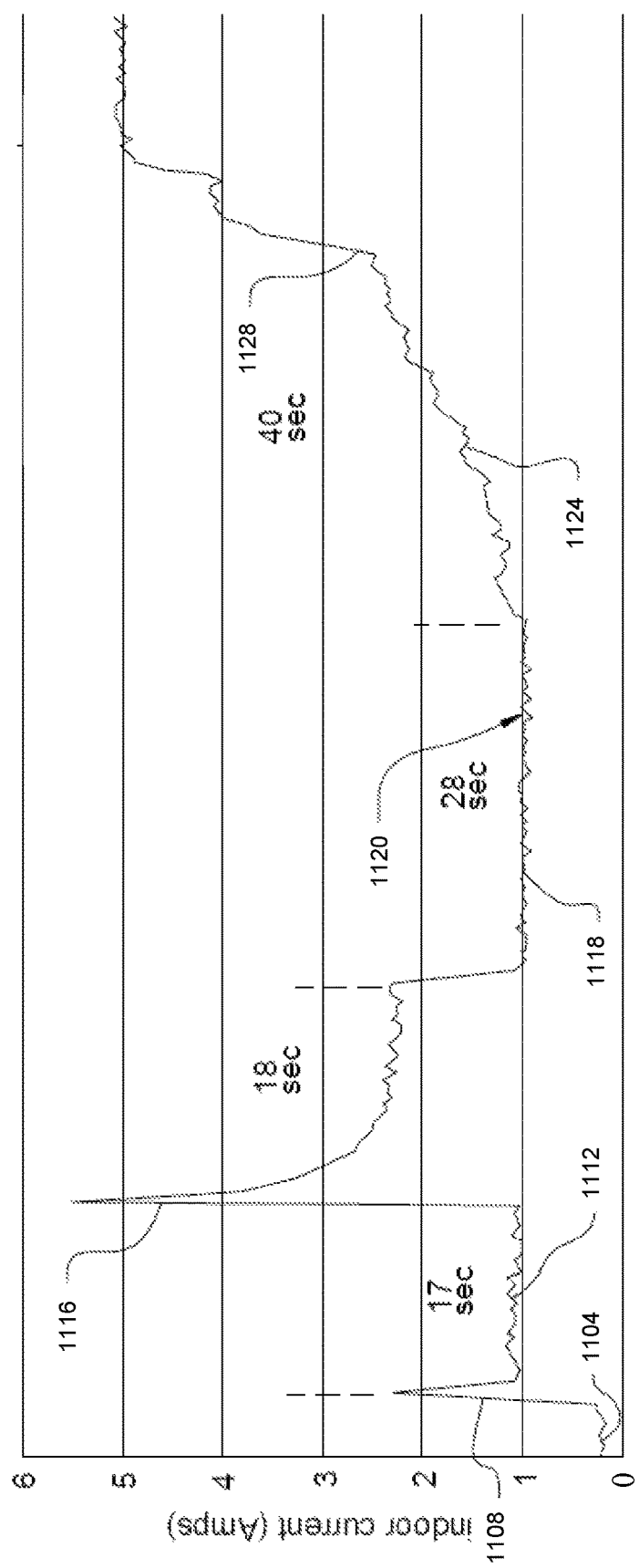
FIG. 9 is an example time domain trace of aggregate current for a beginning of a heat cycle.

In FIG. 9, an aggregate current level begins at a non-zero current 1104 indicating that at least one energy-consuming component is consuming energy. A spike in current 1108 may indicate that another component is turning on. Elevated current 1112 may correspond to operation of the inducer blower. This is followed by a spike 1116, which may indicate the beginning of operation of a hot surface igniter. After opening of a solenoid-operated gas valve, the hot surface igniter may turn off, which returns current to a level corresponding to the inducer blower at 1118. The current may remain approximately flat 1120 until a current ramp 1124 begins, indicating the beginning of circulator blower operation. A spike 1128 may indicate transition from starting to running of the circulator blower.

Figure 10:
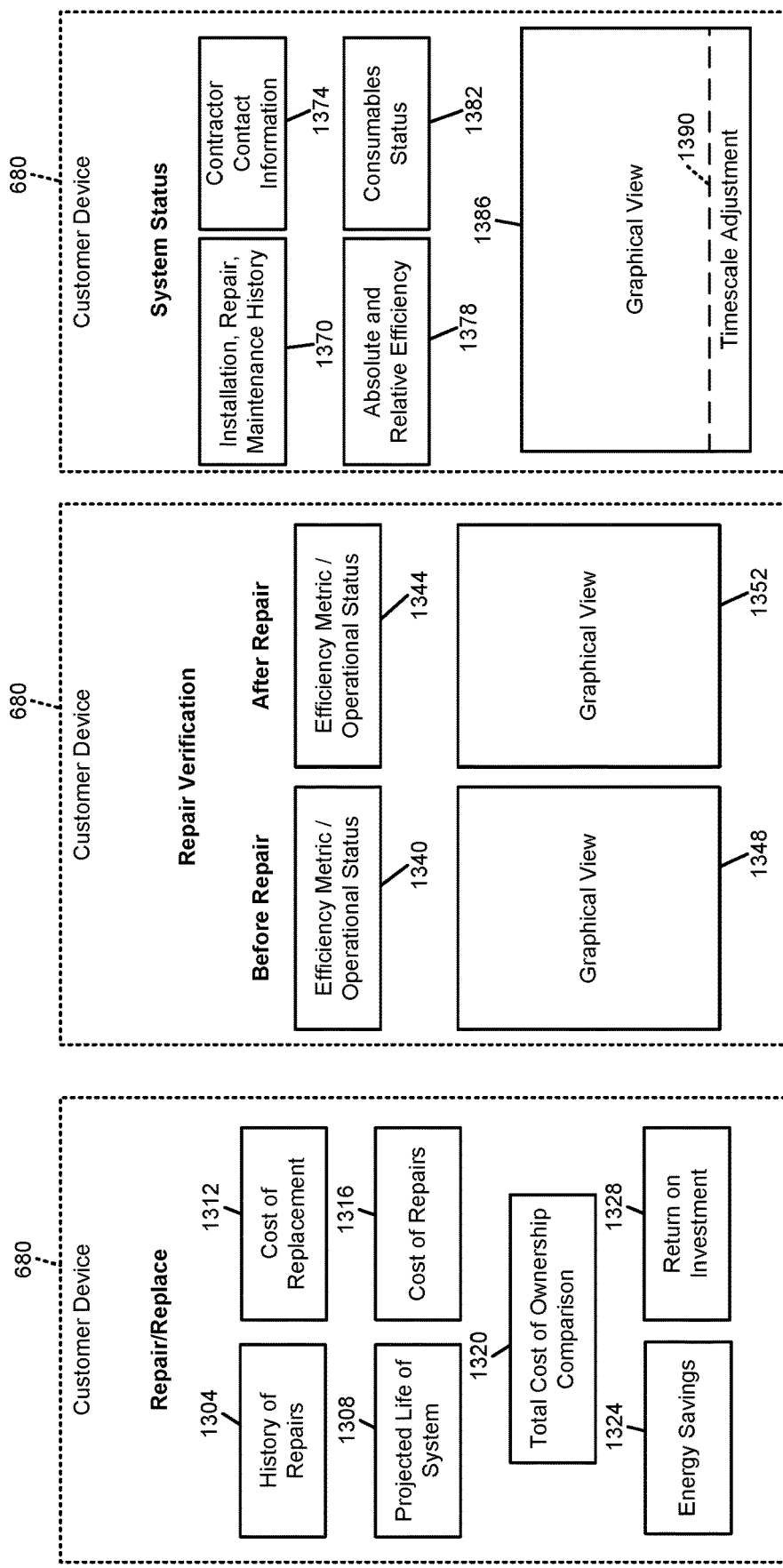
FIGS. 10A-10C are example illustrations of graphical displays presented to a customer.

In FIG. 10A, the customer device 680 is shown with an example repair/replace interface. This interface assists the customer in determining whether to repair or to replace subsystems of the HVAC system or the entire HVAC system. Some or all of the following information can be displayed to the customer based on monitored data. The following list is not exhaustive, however, and additional information can be displayed in various situations based on the data received from the customer's HVAC system as well as comparative data obtained from other systems, including repair history information, pricing information, and operating parameters, such as efficiency. A history of repairs 1304 shows the customer what repairs have been done, the corresponding dates, and the corresponding prices. This may include maintenance, such as filter replacements, tune-ups, etc. A projected life of the current system 1308 shows how long the current system is expected to last with regular maintenance and potential replacement of minor parts. A cost of replacement 1312 is calculated based on past history with previous installations and may include a number of options of systems for the customer. For example, a low, medium, and high efficiency system may each be presented. A cost of repairs 1316 depicts what an expected cost is for current repairs to the HVAC system to bring the HVAC system up to a reasonable level of performance. A total cost of ownership comparison 1320 shows the customer how much their current system will cost to repair and operate in comparison to the cost of a new system being installed and operated. An energy savings 1324 is shown based on expected savings from operating a newer, higher efficiency system. A return on investment 1328 may depict the break-even point, if there is one, that shows where the cost of a new system and its lower operating costs may fall below the total cost of the current system with increased operating costs.

In FIG. 10B, the customer device 680 is shown with a repair verification display. Data received from below the repair can be shown at 1340, and include efficiency metrics, such as the absolute efficiency of the system and a percentage of efficiency compared to install time, manufacturer guidance, and similar systems. In addition, operational status of components of the HVAC system is shown. For example, if it is determined that a flame probe (not shown) has failed, and therefore the HVAC controller cannot detect that a flame is present, the operational status of the flame probe may be shown as failed. Meanwhile, an after repair metric or status 1344 shows what the monitoring system determines subsequent to the repair being performed. A graphical view 1348 may show a graph of efficiency prior to the repair, while a graphical view 1352 shows an efficiency subsequent to the repair. Additionally or alternatively, other data may be displayed graphically. For example, a trace of current in a time domain or a frequency domain spectrum of current may be shown both before in 1348 and after in 1352 with corresponding notations to indicate the failure in 1348, and, assuming the repair was successful, the corresponding rectified data in 1352.

In FIG. 10C, the customer device 680 is shown displaying system status, which the customer may view at any time. In 1370, installation, repair, and maintenance history is shown. In addition, current alert status and previous alerts can be shown. In 1374, contact information for the designated or most recent contractor is shown. At 1378, absolute and relative efficiency of the customer's HVAC system is shown. Efficiency may be shown both for heating and for cooling, and may be shown in absolute numbers, and in relation to neighbors' systems, similar systems in a wider geographic area, manufacturer guidelines, and baseline values. In 1382, consumables status is shown. This may show an expected life of a consumable, such as a filter or humidifier pad. In addition, a timeline for when consumables have been previously replaced or installed is shown. A graphical indicator may depict how much expected life is remaining in the consumable with an estimated date of replacement. In 1386, a graphical view of various system parameters and system data is shown. For example, efficiency since the installation of the monitoring system may be shown. A timescale adjustment 1390 allows the customer to view different periods of time, such as the past one year. In addition, the timescale adjustment 1390 may allow the customer to view only certain windows of time within each year, such as times when the heating system is active or when the cooling system is active.

Figure 11:
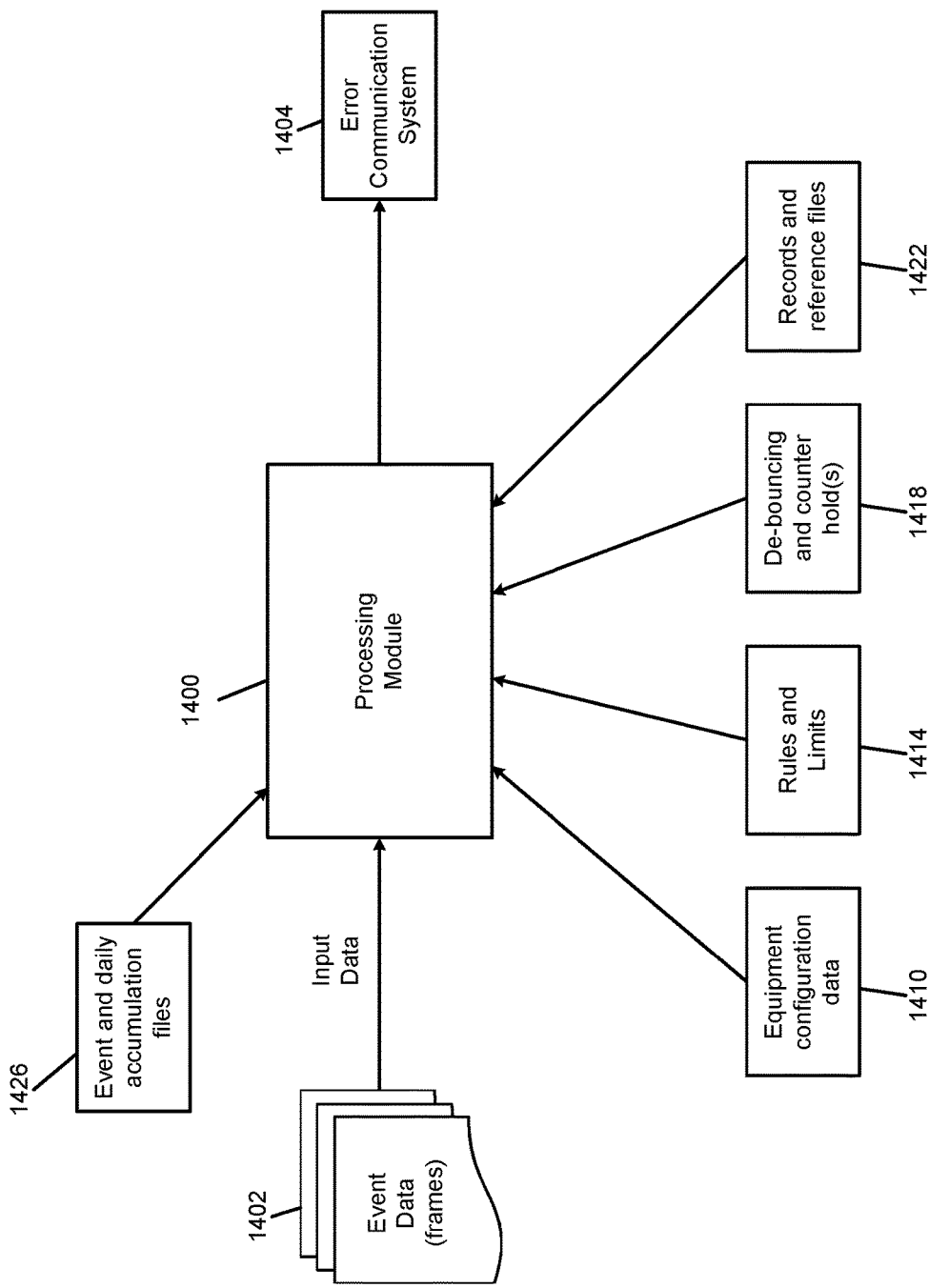
FIG. 11 is an example implementation of cloud processing of captured data.

In FIG. 11, an example representation of cloud processing is shown, where a processing module 1400 receives event data in the form of frames. The processing module 1400 uses various input data for detection and prediction of faults. Identified faults are passed to an error communication system 1404. The event data 1402 may be stored upon receipt from the air handler monitor module and the condensing monitor module.

The processing module 1400 may then perform each prediction or detection task with relevant data from the event data 1402. In various implementations, certain processing operations are common to more than one detection or prediction operation. This data may therefore be cached and reused. The processing module 1400 receives information about equipment configuration 1410, such as control signal mapping.

Rules and limits 1414 determine whether sensor values are out of bounds, which may indicate sensor failures. In addition, the rules and limits 1414 may indicate that sensor values cannot be trusted when parameters such as current and voltage are outside of predetermined limits. For example only, if the AC voltage sags, such as during a brownout, data taken during that time may be discarded as unreliable.

De-bouncing and counter holds 1418 may store counts of anomaly detection. For example only, detection of a single solenoid-operated gas valve malfunction may increment a counter, but not trigger a fault. Only if multiple solenoid-operated gas valve failures are detected is an error signaled. This can eliminate false positives. For example only, a single failure of an energy-consuming component may cause a corresponding counter to be incremented by one, while detection of proper operation may lead to the corresponding counter being decremented by one. In this way, if faulty operation is prevalent, the counter will eventually increase to a point where an error is signaled. Records and reference files 1422 may store frequency and time domain data establishing baselines for detection and prediction. De-bouncing encompasses an averaging process that may remove glitches and/or noise. For example, a moving or windowed average may be applied to input signals to avoid spurious detection of a transition when in fact only a spike (or, glitch) of noise was present.

A basic failure-to-function fault may be determined by comparing control line state against operational state based on current and/or power. Basic function may be verified by temperature, and improper operation may contribute to a counter being incremented. This analysis may rely on return air temperature, supply air temperature, liquid line in temperature, voltage, current, real power, control line status, compressor discharge temperature, liquid line out temperature, and ambient temperature.

Sensor error faults may be detected by checking sensor values for anomalous operation, such as may occur for open-circuit or short-circuit faults. The values for those determinations may be found in the rules and limits 1414. This analysis may rely on return air temperature, supply air temperature, liquid line in temperature (which may correspond to a temperature of the refrigerant line in the air handler, before or after the expansion valve), control line status, compressor discharge temperature, liquid line out temperature, and ambient temperature.

When the HVAC system is off, sensor error faults may also be diagnosed. For example, based on control lines indicating that the HVAC system has been off for an hour, processing module 1400 may check whether the compressor discharge temperature, liquid line out temperature, and ambient temperature are approximately equal. In addition, the processing module 1400 may also check that the return air temperature, the supply air temperature, and the liquid line in temperature are approximately equal.

The processing module 1400 may compare temperature readings and voltages against predetermined limits to determine voltage faults and temperature faults. These faults may cause the processing module 1400 to ignore various faults that could appear present when voltages or temperatures are outside of the predetermined limits.

The processing module 1400 may check the status of discrete sensors to determine whether specifically-detected fault conditions are present. For example only, the status of condensate, float switch, and floor sensor water sensors are checked. The water sensors may be cross-checked against operating states of the HVAC system. For example only, if the air conditioning system is not running, it would not be expected that the condensate tray would be filling with water. This may instead indicate that one of the water sensors is malfunctioning. Such a determination could initiate a service call to fix the sensor so that it can properly identify when an actual water problem is present.

The processing module 1400 may determine whether the proper sequence of furnace initiation is occurring. This may rely on event and daily accumulation files 1426. The processing module 1400 may perform state sequence decoding, such as by looking at transitions as shown in FIG. 10B and expected times during which those transitions are expected. Detected furnace sequences are compared against a reference case and errors are generated based on exceptions. The furnace sequence may be verified with temperature readings, such as observing whether, while the burner is on, the supply air temperature is increasing with respect to the return air temperature. The processing module 1400 may also use FFT processing to determine that the sparker or igniter operation and solenoid-operated gas valve operation are adequate.

The processing module 1400 may determine whether a flame probe or flame sensor is accurately detecting flame. State sequence decoding may be followed by determining whether a series of furnace initiations are performed. If so, this may indicate that the flame probe is not detecting flame and the burner is therefore being shut off. The frequency of retries may increase over time when the flame probe is not operating correctly.

The processing module 1400 may evaluate heat pump performance by comparing thermal performance against power consumption and unit history. This may rely on data concerning equipment configuration 1410, including compressor maps when available.

The processing module 1400 may determine refrigerant level of the air conditioning system. For example, the processing module 1400 may analyze the frequency content of the compressor current and extract frequencies at the third, fifth, and seventh harmonics of the power line frequencies. This data may be compared, based on ambient temperature, to historical data from when the air conditioning system was known to be fully charged. Generally, as charge is lost, the surge frequency may decrease. Additional data may be used for reinforcement of a low refrigerant level determination, such as supply air temperature, return air temperature, liquid line in temperature, voltage, real power, control line status, compressor discharge temperature, and liquid line out temperature.

The processing module 1400 may alternatively determine a low refrigerant charge by monitoring deactivation of the compressor motor by a protector switch, may indicate a low refrigerant charge condition. To prevent false positives, the processing module 1400 may ignore compressor motor deactivation that happens sooner than a predetermined delay after the compressor motor is started, as this may instead indicate another problem, such as a stuck rotor.

The processing module 1400 may determine the performance of a capacitor in the air handler unit, such as a run capacitor for the circulator blower. Based on return air temperature, supply air temperature, voltage, current, real power, control line status, and FFT data, the processing module 1400 determines the time and magnitude of the start current and checks the start current curve against a reference. In addition, steady state current may be compared over time to see whether an increase results in a corresponding increase in the difference between the return air temperature and the supply air temperature.

Similarly, the processing module 1400 determines whether the capacitor in the compressor/condenser unit is functioning properly. Based on compressor discharge temperature, liquid line out temperature, ambient temperature, voltage, current, real power, control line status, and FFT current data, control determines a time and magnitude of start current. This start current is checked against a reference in the time and/or frequency domains. The processing module 1400 may compensate for changes in ambient temperature and in liquid line in temperature. The processing module 1400 may also verify that increases in steady state current result in a corresponding increase in the difference between the compressor discharge temperature and the liquid line in temperature.

The processing module may calculate and accumulate energy consumption data over time. The processing module may also store temperatures on a periodic basis and at the end of heat and cool cycles. In addition, the processing module 1400 may record lengths of run times. An accumulation of run times may be used in determining the age of wear items, which may benefit from servicing, such as oiling, or preemptive replacing.

The processing module 1400 may also grade the customer's equipment. The processing module 1400 compares heat flux generated by the HVAC equipment against energy consumption. The heat flux may be indicated by return air temperature and/or indoor temperature, such as from a thermostat. The processing module 1400 may calculate the envelope of the building to determine the net flux. The processing module 1400 may compare the equipment's performance, when adjusted for building envelope, against other similar systems. Significant deviations may cause an error to be indicated.

The processing module 1400 uses a change in current or power and the type of circulator blower motor to determine the change in load. This change in load can be used to determine whether the filter is dirty. The processing module 1400 may also use power factor, which may be calculated based on the difference in phase between voltage and current. Temperatures may be used to verify reduced flow and eliminate other potential reasons for observed current or power changes in the circulator blower motor. The processing module 1400 may also determine when an evaporator coil is closed. The processing module 1400 uses a combination of loading and thermal data to identify the signature of a coil that is freezing or frozen. This can be performed even when there is no direct temperature measurement of the coil itself.

FFT analysis may show altered compressor load from high liquid fraction. Often, a frozen coil is caused by a fan failure, but the fan failure itself may be detected separately. The processing module 1400 may use return air temperature, supply air temperature, liquid line in temperature, voltage, current, real power, and FFT data from both the air handler unit and the compressor condenser unit. In addition, the processing module 1400 may monitor control line status, switch statuses, compressor discharge temperature, liquid line out temperature, and ambient temperature. When a change in loading occurs that might be indicative of a clogged filter, but the change happened suddenly, a different cause may be to blame.

The processing module 1400 identifies a condenser blockage by examining the approach temperature, which is the difference between the liquid line out temperature and the ambient temperature. When the refrigerant has not been sufficiently cooled from the condenser discharge temperature (the input to the condenser) to the liquid line out temperature (output of the condenser), adjusted based on ambient temperature, the condenser may be blocked. Other data can be used to exclude other possible causes of this problem. The other data may include supply air temperature, return air temperature, voltage, current, real power, FFT data, and control line status both of the air handler unit and the compressor condenser unit.

The processing module 1400 determines whether the installed equipment is oversized for the building. Based on event and daily accumulation files, the processing module evaluates temperature slopes at the end of the heating and/or cooling run. Using run time, duty cycle, temperature slopes, ambient temperature, and equipment heat flux versus building flux, appropriateness of equipment sizing can be determined. When equipment is oversized, there are comfort implications. For example, in air conditioning, short runs do not circulate air sufficiently, so moisture is not pulled out of the air. Further, the air conditioning system may never reach peak operating efficiency during a short cycle.

The processing module 1400 evaluates igniter positive temperature coefficient based on voltage, current, real power, control line status, and FFT data from the air handler unit. The processing module compares current level and slope during warm-up to look for increased resistance. Additionally, the processing module may use FFT data on warm-up to detect changes in the curve shape and internal arcing.

The processing module also evaluates igniter negative temperature coefficient based on voltage, current, real power, control line status, and FFT data from the air handler unit. The processing module 1400 compares current level and slope during warm-up to look for increased resistance. The processing module 1400 checks initial warm-up and trough currents. In addition, the processing module 1400 may use FFT data corresponding to warm-up to detect changes in the curve shape and internal arcing.

The processing module 1400 can also evaluate the positive temperature coefficient of a nitride igniter based on voltage, current, real power, control line status, and FFT data from the air handler unit. The processing module 1400 compares voltage level and current slope during warm-up to look for increased resistance. In addition, the processing module 1400 uses FFT data corresponding to warm-up to detect changes in the curve shape, drive voltage pattern, and internal arcing. Changes in drive voltage may indicate igniter aging, so those adjustments should be distinguished from changes to compensate for gas content and other furnace components.

In FIG. 12A, a table depicts example faults and features, with respect to the air handler unit, that can be detected and/or predicted. Each row corresponds to a fault or feature that may be detected or predicted, and an asterisk is located in each column used to make the detection or prediction. For both detection and prediction, some data may be used as the primary data for making the determination, while other data is used for compensation. Temperatures and voltages are used to perform compensation for those rows having an asterisk in the corresponding column.

The primary columns include timing of when events are detected, time domain current information, temperatures (including building temperature as measured by the thermostat), pressures (such as refrigerant system pressures and/or air pressures), FFT data, and direct detection. Direct detection may occur when a status or control line directly indicates the fault or feature, such as when a water sensor indicates an overfull condensate tray.

In FIG. 12B, a table depicts example faults and features, with respect to the compressor/condenser unit, that can be detected and/or predicted. In FIG. 12B, outside ambient temperature and voltages may be used to compensate primary data.

A monitoring company, which may or may not be affiliated with an HVAC contractor, an HVAC original equipment manufacturer, or an HVAC supplier, offers a monitoring service. The monitoring service may include one or more levels of service, where the levels of service may differ in terms of amount of diagnostics, specificity of data, etc. The monitoring service collects data from local devices connected to HVAC equipment in a building. Although the term HVAC is used, the principles of the present disclosure apply to any environmental comfort system, which may include one or more devices such as heat pumps, air conditioners, or furnaces.

The local devices may be integrated with HVAC equipment by an HVAC original equipment manufacturer or a value added reseller. The local devices may also be installed by an HVAC contractor as the HVAC system is being installed or upgraded, or as a later retrofit.

A customer can subscribe to the monitoring service when the local devices are ready to send data. The principles of the present disclosure also apply to HVAC systems installed in businesses, where a building manager or landlord may subscribe to the monitoring service. Tiered pricing may allow the monitoring service to offer more sophisticated monitoring to businesses. Monitoring for specialized environments, such as a tobacco-drying barn, may be priced higher and may include other forms of monitoring, such as humidity.

Costs for the monitoring service include the monitoring service itself, the cost of the local devices, and the cost of installation of the local devices. For the monitoring service, the monitoring company may charge a periodic rate, such as a monthly or annual rate. The monitoring company may offer plans where monitoring is prepaid in increments such as one year, five years, ten years, etc. The monitoring company may offer discounts for prepayment.

The cost of the monitoring service may be billed directly to the customer or may be billed to a contractor. The contractor may pass along the cost of the monitoring service to the customer. This may be done at the same interval as the contractor is billed. Alternatively, the contractor may receive an up-front payment for the monitoring service upon installation of the local devices.

For example only, a contractor may offer a monitoring package upon installation of a new HVAC system. The package may include the costs of the local devices, installation of the local devices, and a predetermined monitoring period. For example only, the contractor may offer a ten-year monitoring package that will provide for ten years of the monitoring service. The contractor may pre-pay the monitoring company for ten years of service at the time of installation so that the customer is assured of monitoring without concerns about whether the contractor will be in business for ten years. The contractor may offer a discount on the monitoring package when the package is purchased at the time of installation or upgrading of an HVAC system.

When the customer has not prepaid for the monitoring service, the contractor may subsidize the monitoring service costs as long as the customer retains the contractor for service calls and repairs. Contractors may recoup monitoring service costs out of the profit margin of service visits and repairs; contractors may also apply surcharges to service visits and repairs to recoup costs. If the customer chooses a new contractor, the new contractor may assume the subsidization; alternatively, the customer may begin to pay for the full cost of monitoring.

In various implementations, contractors may bundle routine maintenance with a monitoring package. The routine maintenance may provide for periodic visits, such as one or two visits per year, to check on the HVAC system. Additionally or alternatively, the contractor may check the HVAC system after a predetermined number of hours of running, or upon the detection of reduced performance or increased risk of failure. With a monitoring package, these service calls may be offered free or a reduced price. Contractors may also include part discounts and/or labor discounts along with the monitoring package.

The cost of the local devices may be paid by the contractor or the customer at the time of installation. Alternatively, the local devices could be rented, such as on an annual or monthly basis. The cost of the devices may be subsidized or born entirely by the monitoring company, to be recouped by the monitoring service fees. An activation fee may be charged when equipment is first installed, or when monitoring is begun. The activation fee may be paid in installments along with payment for the monitoring service itself. The activation fee may be refunded or waived after a certain period of continuous monitoring. The activation fee may be reduced or waived when a previous customer moves to a new location. In addition, costs of the local devices and/or their installation may be reduced for a previous customer, with the expectation that the customer will remain loyal.

In various implementations, the local devices may be left installed even if they were being rented and the monitoring service is stopped. This may be the case when the cost of uninstalling the equipment outweighs the value of the equipment. In addition, practical problems include potential unwillingness of customers to grant access to a contractor to uninstall equipment for a stopped service. Favorably, by leaving the equipment in place, the original customer or a subsequent customer may reactivate the monitoring service without requiring any reinstallation. In fact, in various implementations the monitoring service may be re-enabled without a physical visit to the customer's building.

Contractors may subsidize some or all of the above costs for a variety of reasons. For example, the monitoring company may offer an interface to contractors that manages customer data, equipment information, and fault information for customers of the contractor subscribing to the monitoring service. This may reduce administrative overhead for the contractor. In addition, this may allow for more efficient scheduling and tasking of service visits. For example, location data for customers may be used to reduce driving distances between service visits. Further, employees can be tasked to service visits for which they have the necessary skills, and likely replacement parts can be carried on the service visits. The monitoring service data may also help to prioritize service visits and estimate time required to complete the service visit. This management software may be implemented by the monitoring service or may be packaged and sold for installation by a contractor.

The above benefits also accrue to customers, who can expect shorter service calls with fewer follow-up visits and parts delays. Better experiences with a contractor improve the relationship between the customer and the contractor and may decrease customer churn. Further, offering monitoring can be a differentiator with respect to other contractors in the area.

Additional reasons for contractor subsidization include that the monitoring service may automatically inform contractors of detected or predicted faults of customer HVAC systems at the same time as the customers are being notified. The monitoring service may also offer customers an interface to observe data related to their HVAC system, and the monitoring service may display or otherwise provide contact information for the contractor that is subsidizing the monitoring expenses.

The monitoring company, the contractor, and/or a third party may offer a consumables replacement package in addition to the monitoring service. For example only, new air filters may be shipped to the customer as needed. The air filter may be shipped when the monitoring system determines a new filter is needed and/or on a calendar basis. For example only, the monitoring system may determine that a new air filter is needed when the HVAC circulator fan has run for a certain number of hours. Additionally or alternatively, the monitoring system may determine a new fan is necessary based on an assessment that air flow through the existing air filter is restricted.

Other consumables, such as humidifier pads and algae pucks, may also be shipped to the customer on a periodic or as needed basis. The contractor may offer to install the new filters or other consumables during routine maintenance visits. Visits to install the consumables may be free or reduced price, either as part of a maintenance package, or as a goodwill gesture to increase customer satisfaction with the contractor and provide for relationship development.

Original equipment manufacturers may also partially or fully subsidize the cost of the monitoring service, local devices, and installation in return for access to information generated by the modules. The information provided to the manufacturers is anonymized—i.e., stripped of any personally identifying data. The information may be further anonymized by including no individual data but only aggregate data, such as averages, standard deviations, totals, etc.

Aggregate data may help manufacturers identify and address common failure modes, assess real world efficiency of installed systems, and analyze equipment usage patterns. The monitoring company may include equipment information, such as manufacturer and model number, which may allow for real world comparisons of reliability and efficiency. This information may be sold to manufacturers or sold to other interested parties in the HVAC business. The monitoring company may also publish, for free or for profit, information about the benefits of monitoring systems. For example, low efficiency corrected based on a detection by the monitoring company may contribute to the monitoring company's metrics. Market studies may also be sold or provided that correlate efficiency and operating parameters with characteristics such as geographical location, climate, building type, building size (for example, in square feet), age of building, HVAC manufacturer and model, equipment age, etc. The monitoring company may offer the opportunity for paid advertising to related industries, such as insulation contractors and HVAC manufacturers, for advertising displayed on monitoring reports and online interfaces to monitoring data.

Utilities, such as gas and electric utilities, may subsidize the costs of the monitoring service, the local devices, and/or the device installation. Utilities may provide this subsidy in order to reduce consumption, as monitoring will tend to minimize inefficient HVAC operation. Utilities may also be able to use monitoring data to show reductions in consumption, which may trigger regulators to allow rates to be raised. Further, utilities are interested in refrigerant charge verification to ensure proper operation.

In addition, in various implementations, the local devices may be equipped to deactivate components of the HVAC system, such as the air conditioning compressor. The deactivation ability may already be present in order to prevent damage to the HVAC system upon detection of a dangerous condition or to prevent water damage when, for example, the air conditioning condenser tray is in danger of overflowing.

The customer may authorize an electric utility to initiate such deactivation at specified times or on specified days, a program that may referred to as interruptible service. The local devices may provide a low cost, for both the utility and the customer, opportunity to take advantage of interruptible service, without the need for a separate electrical meter and the associated electrician installation costs. In return for the ability to interrupt the compressor during times of peak usage, the utility may subsidize the monitoring costs, including equipment, installation, and/or ongoing monitoring. The utility may subsidize the costs either directly by sending money to the customer or to the monitoring company or indirectly through a decrease in the utility bill.

The monitoring company may charge contractors for certifications and training related to installing local devices and administering the monitoring service. The monitoring company may also offer sales training, for free or for a price, on selling monitoring and maximizing the benefits to the customer and contractor from monitoring services. The monitoring company may also offer capital loans to contractors that are actively participating in providing the monitoring service to customers.

The monitoring company may also offer financing or provide an interface to secure financing for HVAC installation projects. This may allow larger developments, such as condominiums or new neighborhoods, to be preinstalled to offer monitoring. The monitoring company may offer, or partner with a third party who offers, home warranties. The home warranty may cover HVAC equipment and may include additional significant appliances in the home, such as a hot water heater. The home warranty may be more comprehensive, including wiring, plumbing, roof, windows, etc. Discounts may be given for purchasing a home warranty in conjunction with a monitoring package.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A method of operating a heating, ventilation, or air conditioning (HVAC) monitoring system, the method comprising:
   at a remote monitoring apparatus, the remote monitoring apparatus having a processor and a memory, periodically receiving frames of data from a local monitoring device installed at a building, wherein the remote monitoring apparatus is geographically separate from the building, and wherein each individual frame of the frames of data corresponds to a window of time and each individual frame includes:
      (i) time domain current data based on a measured aggregate current supplied to a plurality of components of an HVAC system of the building; and
      (ii) frequency domain current data based on the measured aggregate current;
   storing current data in the memory of the remote monitoring apparatus for each individual frame of the frames of data, wherein the current data includes (i) a single time domain current value based on the time domain current data and (ii) the frequency domain current data;
   using the processor of the remote monitoring apparatus, based on the stored current data and exclusive of individual current data from a plurality of individual current sensors respectively configured for monitoring each of the plurality of components of the HVAC system, determining an individual contribution of a first component of the plurality of components of the HVAC system to the measured aggregate current;
   transmitting information to an HVAC manufacturer, wherein the information is based on the stored current data;
   selectively identifying a problem occurring in the first component using the determined individual contribution; and
   in response to the problem being identified, selectively transmitting an alert message.

2. The method of claim 1, wherein the information includes at least one of (i) efficiency data of the HVAC system and (ii) data describing repairs made to the HVAC system.

3. The method of claim 1, further comprising:
   stripping personally identifiable information from the information prior to transmission to the HVAC manufacturer.

4. The method of claim 1 further comprising:
   receiving a subscription fee corresponding to the building;
   in response to the problem being identified in the first component and receipt of the subscription fee, verifying occurrence of the problem with additional data received from the local monitoring device; and
   in response to verification of the identified problem, transmitting the alert message to at least one of a customer corresponding to the building and a contractor servicing the building.

5. The method of claim 1, wherein a single power supply current represents the measured aggregate current.

6. The method of claim 1, wherein each individual frame of the frames of data further includes at least one of: (i) data based on one or more line or coil temperatures of one or more lines or coils of the HVAC system; (ii) data based on one or more measured pressures of a refrigerant loop of the HVAC system; or (iii) data based on one or more voltages measured by one or more voltage sensors of the HVAC system.

7. The method of claim 1, wherein:
   the frames of data include primary data and secondary data;
   the method includes compensating the primary data using the secondary data; and
   identifying the problem occurring in the first component is performed based on the compensated primary data.

8. The method of claim 1 further comprising:
   receiving a subscription fee corresponding to the building, wherein the subscription fee is at least partially subsidized by at least one of a utility company supplying power to the HVAC system and the HVAC manufacturer, and wherein the subscription fee applies to a calendar period and the transmitting of the alert message is restricted to the calendar period.

9. The method of claim 8, wherein the at least one of the utility company and the HVAC manufacturer subsidizes the subscription fee by either (i) sending money to a customer corresponding to the building or (ii) directly sending money to the HVAC monitoring system.

10. The method of claim 8, wherein:
    the at least one of the utility company and the HVAC manufacturer is the utility company; and
    the utility company subsidizes the subscription fee by reducing a utility bill sent to a customer corresponding to the building.

11. The method of claim 1, further comprising:
    providing the local monitoring device for installation in the HVAC system of the building.

12. The method of claim 11, further comprising:
    selling the local monitoring device,
    wherein a price of the local monitoring device includes a subscription fee,
    wherein the subscription fee applies to a calendar period and the calendar period begins when the local monitoring device is activated, and wherein transmission of the alert message is suppressed outside of the calendar period.

13. The method of claim 11, further comprising:
providing a second local monitoring device for installation at the building.

14. The method of claim 13, wherein:
the local monitoring device is located proximate to an air handler unit of the HVAC system;
the second local monitoring device is located proximate to a condensing unit of the HVAC system; and
each individual frame of the frames of data further includes one of (i) electrical sensor data of the air handler unit measured by the local monitoring device and (ii) electrical sensor data of the condensing unit measured by the second local monitoring device.

15. A heating, ventilation, or air conditioning (HVAC) monitoring system comprising:
memory and at least one processor, wherein the memory stores computer-executable instructions for execution on the at least one processor, and wherein the instructions include:
periodically receiving frames of data from a local monitoring device installed at a building, wherein the HVAC monitoring system is geographically separate from the building, and wherein each individual frame of the frames of data corresponds to a window of time and each individual frame includes:
(i) time domain current data based on a measured aggregate current supplied to a plurality of components of an HVAC system of the building; and
(ii) frequency domain current data based on the measured aggregate current;
storing current data for each individual frame of the frames of data, wherein the current data includes (i) a single time domain current value based on the time domain current data and (ii) the frequency domain current data;
based on the stored current data and exclusive of individual current data from a plurality of individual current sensors respectively configured for monitoring each of the plurality of components of the HVAC system, determining an individual contribution of a first component of the plurality of components of the HVAC system to the measured aggregate current;
transmitting information to an HVAC manufacturer, wherein the information is based on the stored current data;
selectively identifying a problem occurring in the first component using the determined individual contribution; and
in response to the problem being identified, selectively transmitting an alert message.

16. The HVAC monitoring system of claim 15, wherein the information includes at least one of (i) efficiency data of the HVAC system and (ii) data describing repairs made to the HVAC system.

17. The HVAC monitoring system of claim 15, wherein the instructions further include:
stripping personally identifiable information from the information prior to transmission to the HVAC manufacturer.

18. The HVAC monitoring system of claim 15 wherein the instructions further include:
receiving a subscription fee corresponding to the building;
in response to the problem being identified in the first component and receipt of the subscription fee, verifying occurrence of the problem with additional data received from the local monitoring device; and
in response to verification of the identified problem, transmitting the alert message to at least one of a customer corresponding to the building and a contractor servicing the building.

19. The HVAC monitoring system of claim 15 wherein:
the instructions further include receiving a subscription fee corresponding to the building;
the subscription fee is at least partially subsidized by at least one of a utility company supplying power to the HVAC system and the HVAC manufacturer; and
the subscription fee applies to a calendar period and the transmitting of the alert message is restricted to the calendar period.

20. The HVAC monitoring system of claim 15, wherein:
the local monitoring device is located proximate to an air handler unit of the HVAC system;
a second local monitoring device is located proximate to a condensing unit of the HVAC system; and
each individual frame of the frames of data further includes one of (i) electrical sensor data of the air handler unit measured by the local monitoring device and (ii) electrical sensor data of the condensing unit measured by the second local monitoring device.

* * * * *